United States Patent
Veijalainen et al.

(10) Patent No.: US 11,418,270 B2
(45) Date of Patent: Aug. 16, 2022

(54) RADIO-NETWORK SELF-OPTIMIZATION BASED ON DATA FROM RADIO NETWORK AND SPATIOTEMPORAL SENSORS

(71) Applicant: NOKIA TECHNOLOGIES OY, Espoo (FI)

(72) Inventors: Teemu Mikael Veijalainen, Helsinki (FI); Lauri Ilari Kuru, Espoo (FI); Jani Matti Johannes Moilanen, Helsinki (FI); Mikko Johannes Honkala, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/250,900

(22) PCT Filed: Sep. 28, 2018

(86) PCT No.: PCT/EP2018/076533
§ 371 (c)(1),
(2) Date: Mar. 22, 2021

(87) PCT Pub. No.: WO2020/064134
PCT Pub. Date: Apr. 2, 2020

(65) Prior Publication Data
US 2022/0021469 A1    Jan. 20, 2022

(51) Int. Cl.
*H04B 17/29* (2015.01)
*H04B 17/15* (2015.01)
(Continued)

(52) U.S. Cl.
CPC ............ *H04B 17/29* (2015.01); *H04B 17/15* (2015.01); *H04L 41/16* (2013.01); *H04L 43/022* (2013.01); *H04W 24/10* (2013.01)

(58) Field of Classification Search
CPC ....... H04B 17/29; H04L 43/022; H04L 41/16; H04W 24/10
See application file for complete search history.

(56) References Cited

U.S. PATENT DOCUMENTS

| 10,175,666 B2 * | 1/2019 | Baez | H04W 4/70 |
| 2016/0295435 A1 * | 10/2016 | Baroudi | H04W 4/70 |

(Continued)

FOREIGN PATENT DOCUMENTS

| CN | 105578472 B | * | 11/2018 | |
| CN | 105979599 B | * | 3/2019 | H04W 72/085 |
| WO | 2018125346 A1 | | 7/2018 | |

OTHER PUBLICATIONS

International Search Report and Written Opinion for International Application No. PCT/EP2018/076533, dated Mar. 8, 2019, 11 pages.

(Continued)

*Primary Examiner* — Redentor Pasia
(74) *Attorney, Agent, or Firm* — Brake Hughes Bellermann LLP

(57) ABSTRACT

A technique includes receiving, from one or more sensors, sensor data samples; receiving radio network information data samples associated with a radio network; determining, based on an association of one or more received sensor data samples with one or more of the received radio network information data samples, a first set of one or more associated sensor and radio network information data samples; developing a model that is trained based on at least a portion of the first set the associated sensor and radio network information data samples that are relevant to performance of the radio network; and improving performance of the radio network based on at least the model.

28 Claims, 27 Drawing Sheets

(51) Int. Cl.
  *H04L 41/16*    (2022.01)
  *H04L 43/022*   (2022.01)
  *H04W 24/10*    (2009.01)

(56) References Cited

U.S. PATENT DOCUMENTS

| | | | |
|---|---|---|---|
| 2017/0094592 A1* | 3/2017 | Tabatabaei | G06N 20/10 |
| 2018/0114140 A1 | 4/2018 | Chen et al. | |
| 2018/0176663 A1* | 6/2018 | Damaggio | H04L 41/0816 |
| 2018/0234266 A1* | 8/2018 | Rudolph | H04L 67/12 |
| 2019/0121350 A1* | 4/2019 | Cella | G05B 19/41875 |
| 2019/0140906 A1* | 5/2019 | Furuichi | H04L 67/12 |
| 2020/0387419 A1* | 12/2020 | Yang | G01N 33/246 |

OTHER PUBLICATIONS

International Preliminary Report on Patentability for International Application No. PCT/EP2018/076533, dated Apr. 21, 2020, 24 pages.
Mnih et al.; "Playing Atari with Deep Reinforcement Learning"; NIPS Deep Learning Workshop 2013; Dec. 2013; 9 pages.

* cited by examiner

RADIO-NETWORK SELF-OPTIMIZATION BASED ON DATA FROM RADIO NETWORK AND SPATIOTEMPORAL SENSORS

CROSS-REFERENCE TO RELATED APPLICATIONS

This application is a national stage entry of International Application No. PCT/EP2018/076533, filed Sep. 28, 2018, entitled "RADIO-NETWORK SELF-OPTIMIZATION BASED ON DATA FROM RADIO NETWORK AND SPATIOTEMPORAL SENSORS" which is hereby incorporated by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. For example, ultra-reliable and low-latency communications (URLLC) devices may require high reliability and very low latency.

SUMMARY

According to an example embodiment, a method includes receiving, from one or more sensors, sensor data samples; receiving radio network information data samples associated with a radio network; determining, based on an association of one or more received sensor data samples with one or more of the received radio network information data samples, a first set of one or more associated sensor and radio network information data samples; developing a model that is trained based on at least a portion of the first set the associated sensor and radio network information data samples that are relevant to performance of the radio network; and improving performance of the radio network based on at least the model.

According to an example embodiment, an apparatus includes at least one processor and at least one memory including computer instructions, when executed by the at least one processor, cause the apparatus to receive, from one or more sensors, sensor data samples; receive radio network information data samples associated with a radio network; determine, based on an association of one or more received sensor data samples with one or more of the received radio network information data samples, a first set of one or more associated sensor and radio network information data samples; develop a model that is trained based on at least a portion of the first set the associated sensor and radio network information data samples that are relevant to performance of the radio network; and improve performance of the radio network based on at least the model.

According to an example embodiment, a non-transitory computer-readable storage medium includes instructions stored thereon that, when executed by at least one processor, are configured to cause a computing system to perform a method of receiving, from one or more sensors, sensor data samples; receiving radio network information data samples associated with a radio network; determining, based on an association of one or more received sensor data samples with one or more of the received radio network information data samples, a first set of one or more associated sensor and radio network information data samples; developing a model that is trained based on at least a portion of the first set the associated sensor and radio network information data samples that are relevant to performance of the radio network; and improving performance of the radio network based on at least the model.

The details of one or more examples of embodiments are set forth in the accompanying drawings and the description below. Other features will be apparent from the description and drawings, and from the claims.

DETAILED DESCRIPTION

Figure 1:
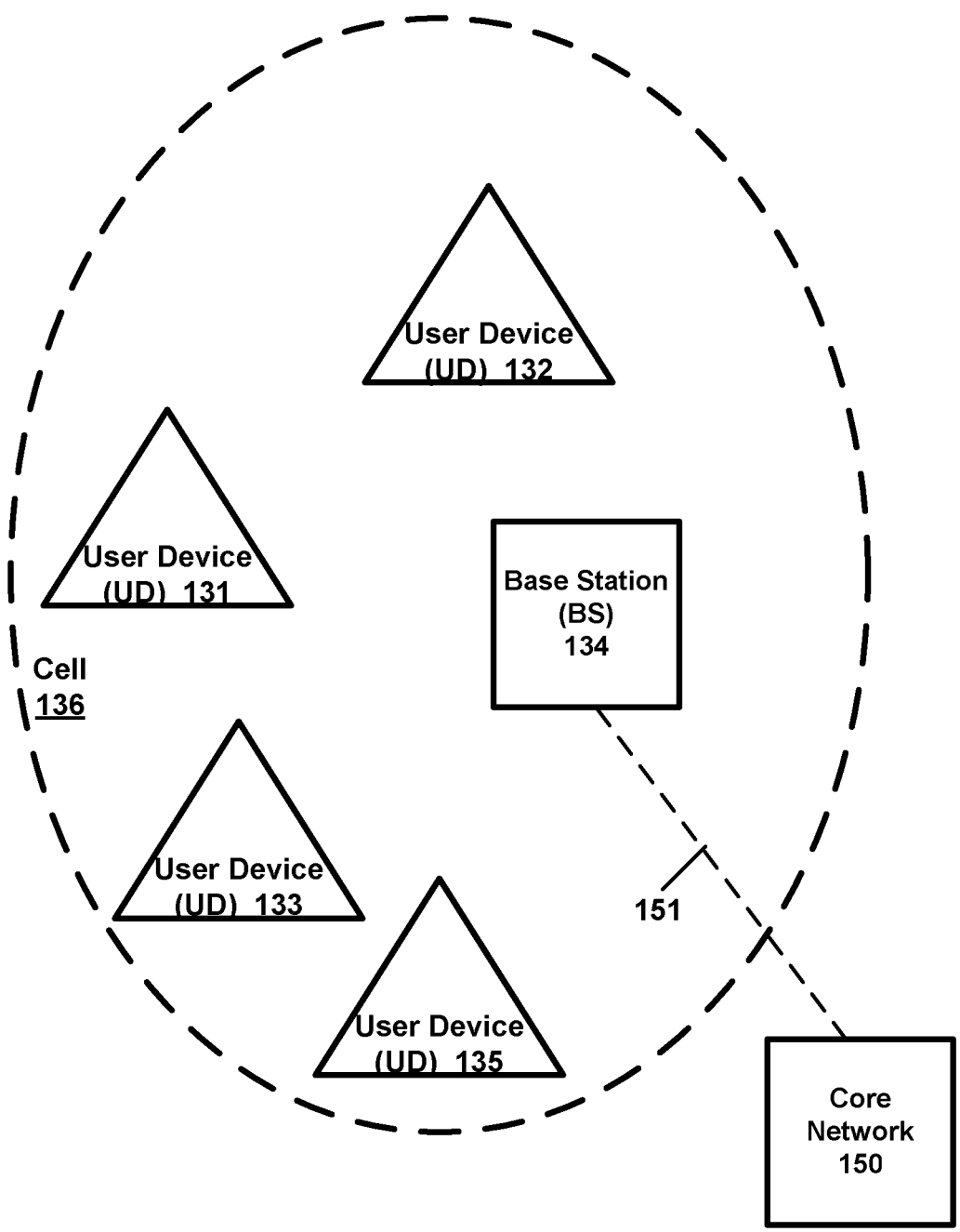
FIG. 1 is a block diagram of a wireless network according to an example embodiment.

According to an example embodiment, a model (e.g., an artificial intelligence neural network model) may be used to improve the performance of a radio network. For example, a technique may include receiving, from one or more sensors, sensor data samples; receiving radio network information data samples associated with a radio network; determining, based on an association of one or more received sensor data samples with one or more of the received radio network information data samples, a first set of one or more associated sensor and radio network information data samples; developing a model that is trained based on at least a portion of the first set the associated sensor and radio network information data samples that are relevant to performance of the radio network; and improving performance of the radio network based on at least the model. For example, the improving performance of the radio network may include: determining a second set of one or more associated sensor and radio network information data samples; and performing or causing another entity to perform one or more radio network actions and/or one or more non-radio network actions (e.g., preemptive actions before a significant decrease in radio network performance is detected) to improve the performance of the radio network, based on the model and the second set of one or more associated sensor and radio network information data samples. Thus, according to an example embodiment, the first set of one or more associated sensor and radio network information (ASRI) data samples may include training data that may be used to train the model; and the second set of one or more associated sensor and radio network information (ASRI) data samples may include live data that is used, with the trained model, to perform or cause another entity to perform one or more radio network actions and/or one or more non-radio network actions to improve the performance of the radio network. For example, the performing or causing another entity to perform one or more non-radio network actions may include, e.g., performing or causing another entity to perform a change in a position, location, orientation, speed and/or movement of an object that impacts performance of the radio network. Furthermore, the developing a model that is trained may include training the model based on supervised learning, reinforcement learning, and/or unsupervised learning.

In another example embodiment, a method or technique may further include determining a resulting change in a performance of the radio network in response to the one or more radio network actions and/or one or more non-radio network actions; determining a reward associated with the performed one or more radio network actions and/or performed one or more non-radio network actions, wherein the reward is based on whether the performed one or more radio network actions and/or performed one or more non-radio network actions results in or is associated with an increase or decrease in performance of the radio network. Also, according to a further example embodiment, the developing the model may include: training the model based on the first set of one or more associated sensor and radio network information data samples; and performing further training of the model based on the second set of one or more associated sensor and radio network information data samples and the performed one or more radio network actions and/or one or more non-radio network actions.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G, cmWave, and/or mmWave band networks, IoT, MTC, eMTC, eMBB, URLLC, etc., or any other wireless network or wireless technology. These example networks, technologies or data service types are provided only as illustrative examples.

As noted, 5G technologies are expected to significantly increase data rates (or bandwidths) and/or decrease latency. Many of the 5G technologies, such as URLLC, may require very strict performance, such as guaranteed low latency. However, the dynamic nature of a physical environment may cause radio network performance to frequently or continuously change. In some cases, environmental changes may cause radio network performance to degrade to a level that does not meet required 5G performance requirements for some 5G applications (e.g., URLLC applications), such as requirements for BLER or latency, as noted above. A UE or BS may measure a change in a KPI (key performance indicator), such as a change in signal-to-interference plus noise ratio, received signal strength, block error rate (BLER), or other KPI or measurement, e.g., indicating a degrading radio network performance. However, due to very strict 5G network performance requirements (e.g., for latency and/or BLER or other requirements), in many cases, there may not be sufficient time for a UE or BS to detect a degrading radio network performance, e.g., of the radio/wireless channel between the UE and BS), and then take an action to improve radio network performance before the performance of the radio network or wireless channel drops below an acceptable level for 5G application(s). According to an illustrative example, a UE or BS may detect a drop in SNR or received signal strength, for example, of a wireless channel between the UE and BS, and then may request or perform an increase in connection robustness (e.g., by using more robust modulation and coding scheme and/or activating additional multi-connectivity links) or a handover to another BS, e.g., to avoid a disconnection or in attempt to improve radio network performance for the UE. Thus, for example, such a reactive approach of detecting a radio network performance change (e.g., detecting a decrease in SNR or decrease in received signal strength or other KPI change), and then subsequently reacting to such detected change by performing some action for the radio network may not be adequate for the strict latency and BLER requirements of 5G wireless networks. For example, increasing the link robustness and/or performing a handover reactively, in this example, may still result in radio network performance degrading to a level that is below the requirements of 5G (e.g., BLER and/or latency may be unacceptably high, or even a connection failure may occur). This problem in reacting to a measured change in a radio measurement or measured KPI for the radio network may arise because, for example, by the time the change in measurement or KPI for the radio network has been detected, there may be insufficient time to perform one or more actions to avoid further degradation in network performance.

Therefore, according to an example embodiment, a more predictive or a more preemptive approach may be used to address an expected or predicted change in radio network performance based on one or more associated sensor and radio network information data samples. A key benefit or technical advantage of such approach is that, it enables execution or performing of preemptive corrective actions before the network performance has degraded below an acceptable level for critical application(s), such as URLLC. This is possible because the associated sensor and radio network data brings new information for the optimization method thus allowing to predict events that are not predictable (or difficult to predict) with the traditional approach, that is to utilize only the radio network data. For example, a deterministic nature of a physical environment may be used to perform one or more preemptive corrective actions, such as one or more preemptive corrective radio network actions and/or preemptive corrective non-radio network actions, e.g., to improve radio network performance. Some of the associated sensor and radio network information data samples may be selected that are relevant to performance of the radio network (e.g., associated with or may indicate a likely or expected decrease in radio network performance). For example, based on past associated sensor data samples and radio network information data samples, specific patterns in behavior or movement of objects or changes in the physical environment may be associated with current and/or future (e.g., expected or predicted) changes in radio network performance.

Thus, because spatiotemporal sensor data related to the physical environment may correlate with certain radio network information, the associated sensor and radio network information (ASRI) data samples may be used to predict future radio network performance. In particular, the prediction of future radio network performance may be enhanced through the use of spatiotemporal sensor data (that is associated with radio network information), as compared to using only radio network information. Furthermore, as noted, an artificial intelligence (AI) neural network model may be used to further improve prediction of future radio network performance and identify one or more preemptive corrective actions that may be performed to improve radio network performance. For example, a first set of associated sensor and radio network information (ASRI) data (e.g., training data) may be used to train the AI neural network model to learn correlating patterns among the spatiotemporal sensor data and radio network information. Then, a second (e.g., subsequent) set of ASRI data (e.g., live ASRI data) may be input to the trained AI neural network model in order to output one or more preemptive corrective actions to improve the radio network performance. For example, based on received live ASRI data, the AI neural network model may trigger or cause one or more actions (e.g., preemptive corrective actions) to be performed to improve the performance of the radio network such as to maintain the radio network performance above an acceptable level, rather than performing a reactive action only after deterioration of the radio network performance has been detected. Thus, because the AI neural network model has previously learned correlating patterns between the sensor data and radio network information (ASRI) data, one or more preemptive corrective actions may be determined and performed based on the live ASRI data input to the AI neural network model. According to an illustrative example embodiment, the trained AI model may receive live ASRI data and then perform or cause another entity to perform one or more preemptive corrective actions, e.g., such as increasing transmission power, changing a modulation and coding scheme (MCS) for a UE to a more robust MCS, performing a handover of the UE to a different BS, improving connection robustness, such as by adding a link for a multi-link connection for the UE, or other radio network action and/or non-radio network action.

According to an example embodiment, a method may include: receiving, from one or more sensors, sensor data samples; receiving radio network information data samples associated with a radio network; determining, based on an association of one or more received sensor data samples with one or more of the received radio network information data samples, one or more associated sensor and radio network information data samples; selecting at least some of the one or more associated sensor and radio network information data samples that are relevant to performance of the radio network; and forwarding the selected associated sensor and radio network information data samples for subsequent use.

The deterministic nature of most URLLC environments, provides high gain potential for a radio network to predictively (or preemptively) optimize its parameters. According to an example embodiment, radio network measurements (e.g., UE measurements) may be mapped to or associated with the state of the physical environment. These mappings or associated information may then be used by models or predictive algorithms (such as artificial intelligence models or methods such as reinforcement learning with Q-learning, or other models) for network self-optimization, in order to improve network performance. In this manner, states and actions which are leading to better performance or errors can be detected, and actions (e.g., radio network actions, or possible changes in the physical environment) may be performed that are predicted or expected to improve radio network performance (e.g., increase SINR, avoid a connection failure or disconnection, reduce latency, . . . ).

Figure 2:
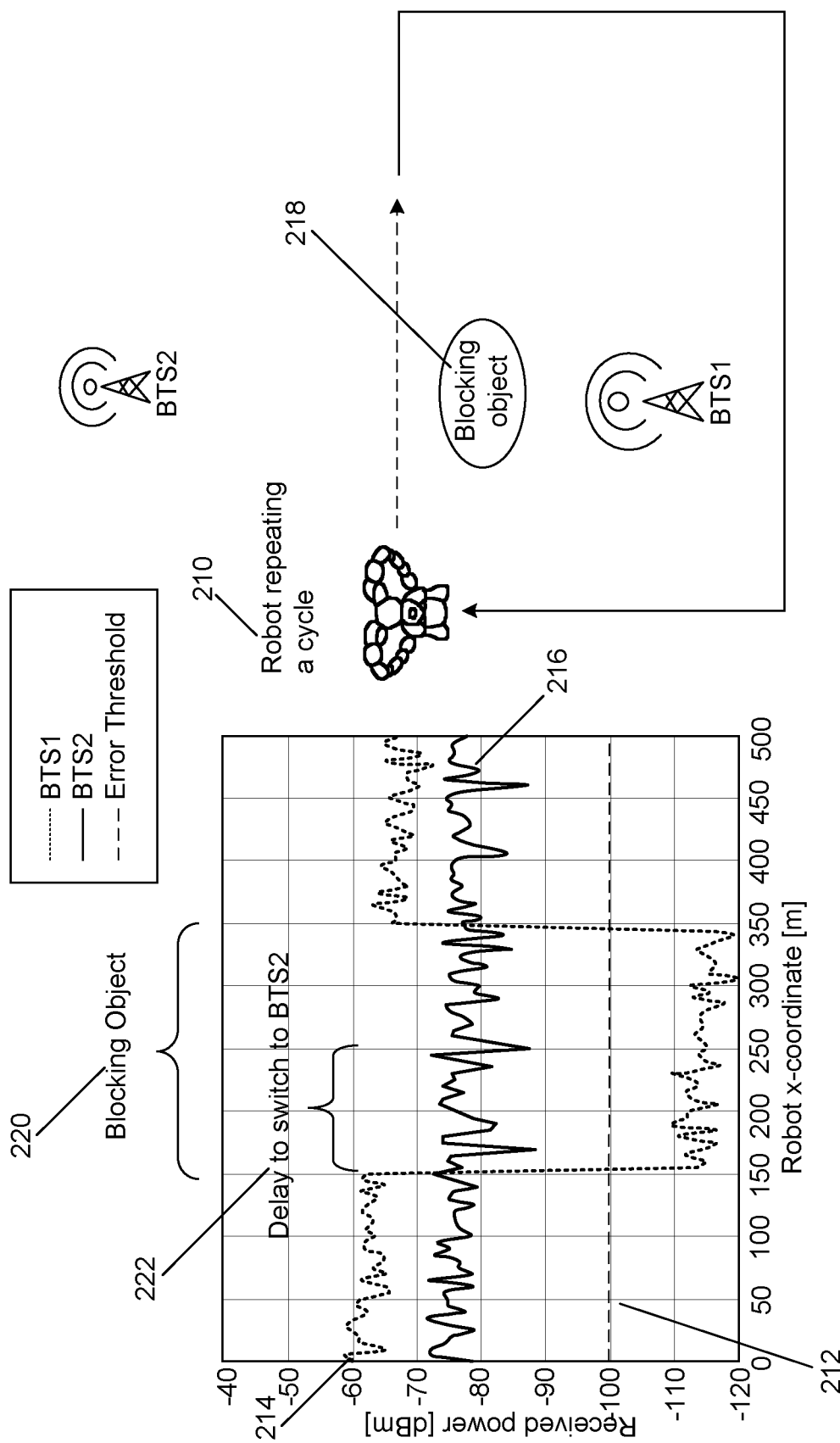
FIG. 2 is a diagram illustrating deterministic behavior between location of a user device/UE provided on a robot and changes in received power for the user device/UE due to a blocking object according to an example embodiment.

FIG. 2 is a diagram illustrating deterministic behavior between location (or position) of a user device/UE provided on a robot and changes in received power for the user device/UE due to a blocking object according to an example embodiment. In the illustrative example shown in FIG. 2, a signal blockage at 220 occurs between UE (robot repeating a deterministic path) and base station BTS1 when the robot 210 passes behind a blocking object 218 with respect to BTS1, resulting in a signal level 214 from BTS1 that drops below an error threshold 212, e.g., when the robot/UE is located at an x-coordinate of between 150 m and 350 m (220).

According to an example embodiment, one solution to this type of situation may include a handover of the UE on the robot 210 from BTS1 to BTS2 (which does not suffer the decrease in received power, as shown by received power signal 216 from BTS2). As noted, one solution to solve this issue may be a handover of the UE to BTS2. However, a delay 222 to perform such handover of the UE from BTS1 to BTS2 is very significant, and may not be short enough to prevent a loss in the connection (or dropped connection) between the UE and BTS1. Thus, in this illustrative example, because the traditional handover methods are reactive and the signal level may drop very fast, the delay 222 to switch (or handover) the UE to BTS2 causes errors that are not tolerated by the URLLC requirements, as an example. Since the radio signal variations before the signal blockage won't necessarily indicate the upcoming decrease in received power by the UE, the traditional methods of reacting to the decrease in received power (or other detected decrease in network performance) may not effectively prevent further degradation in network performance or an error condition for the radio network. For example, as noted above, a reactionary approach to improve a radio network performance (e.g., performing an action only after a decrease in radio network performance has been measured or detected by a UE or BS) may typically not prevent further decrease in radio network performance, or even avoid certain error conditions, for 5G networks (e.g., URLLC or other applications) that may have very strict requirements in terms of latency, BLER, handover delay, data rate, reliability. . . . In other words, due to the strict performance requirements of some 5G applications, such as URLLC, there may not be sufficient time, after detection of a decrease in network performance (e.g., detecting a decrease in SINR or received signal strength), to perform a (reactive or reactionary) radio network action to prevent a further and unacceptable decrease in radio network performance.

Therefore, according to an example embodiment, a correlation or association between radio network performance (or data samples associated with a radio network) and sensor data samples that indicate a state of a physical environment (e.g., location of the robot) may be used to predict a future radio network performance and/or perform an radio network action that may improve network performance. For example, based on an association or correlation between robot location/position and received power, a handover of the UE may be performed preemptively (e.g., before a significant decrease in received power is detected) when the location of the robot 210 moves from 130 m to 140 m (e.g., location is before the x-coordinate of 150 m where the decrease in radio network performance (e.g., received power) is first typically detected. In this example, the handover from BTS1 to BTS2 may be performed when robot reaches an x-coordinate of 140 m, in order to provide sufficient time that is greater than or equal to delay 222, e.g., to improve performance of the radio network (e.g., in this case, to avoid a decrease in received power below threshold 212 and/or a loss in the connection between UE and BTS1).

Figure 3:
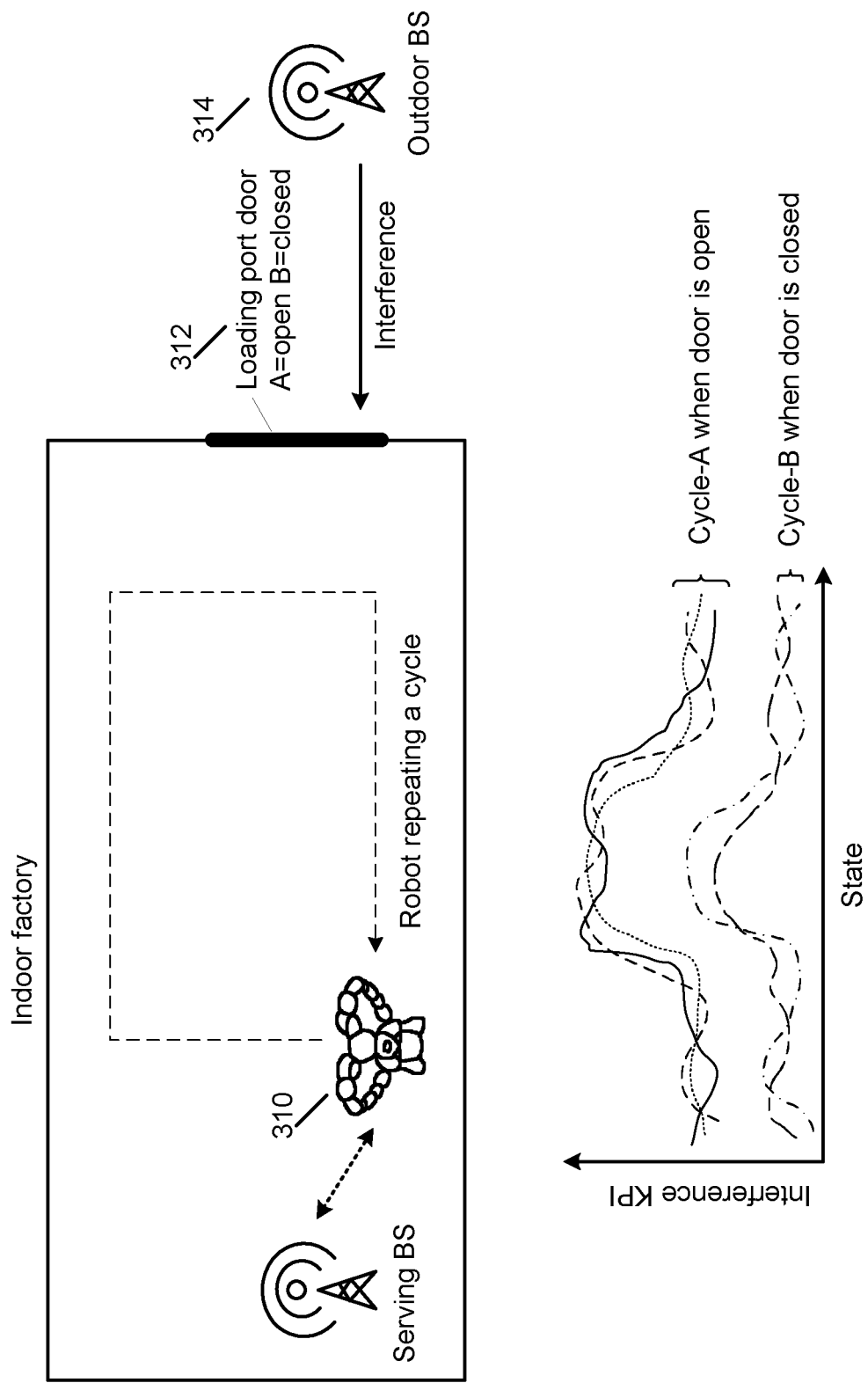
FIG. 3 is a diagram illustrating a robot that repeats a cycle in a factory according to an example embodiment.

Thus, a challenge may exist in how to consider dynamic changes of the physical environment that impact the deterministic behavior of the radio channel or radio network (introducing another deterministic cycle). The problem is demonstrated in FIG. 3 where a robot 310 repeats a cycle in a factory. When loading port door 312 of the factory is closed, interference from outdoor base station 314 experienced by the robot 310 follows a deterministic cycle-A. When the door opens more interference propagates indoors and a new deterministic cycle is introduced (cycle-B). For example, a state of the physical environment may indicate a state, location, position, orientation (or other physical characteristic) of physical objects in the environment. For instance, the location of robots, orientation of robot arms etc. Thus, in this case, the state of the loading port door 312 may be associated with a current or future radio network performance. Thus, as shown in FIG. 3, the interference from the outdoor BS 314 is greater when the loading port door 312 is open. Thus, in this example, it can be seen that the state of the physical environment may be used to predict a future state of the radio network (or future state of radio network performance, and/or may be used to try different actions (e.g., different radio network actions and/or physical environment actions) to determine which action provides the best improvement in radio network performance. For example, one or more actions may be performed (or even performed and then measured to determine which action(s) provide the best performance increase), such as, e.g., increasing transmission power to the UE of robot 310, or using a more robust modulation and coding scheme for a transmission to the UE/robot 310 just before the loading port door 312 opens, or changing the loading port door to open at a different time that impacts the radio network performance less.

According to an example embodiment, a method may include receiving, from one or more sensors, sensor data samples; receiving radio network information data samples associated with a radio network; determining, based on an association of one or more received sensor data samples with one or more of the received radio network information data samples, one or more associated sensor and radio network information data samples; selecting at least some of the one or more associated sensor and radio network information data samples that are relevant to performance of the radio network; and forwarding the selected associated sensor and radio network information data samples for subsequent use. According to an example embodiment, the sensor data samples comprise spatiotemporal sensor data samples associated with a physical environment. For example, spatiotemporal data samples may include data samples, which indicate a state of an object or a state of the physical environment at a particular time or sample time. Also, according to an example embodiment, the forwarding may include, e.g., storing the selected associated sensor and radio network information data samples, and/or forwarding the selected associated sensor and radio network information data samples for processing. The method may further include performing, based on the selected associated sensor and radio network information data samples, at least one action, e.g., where the action may include, for example, performing a radio network action such as adjusting a radio network parameter or configuration, and/or performing an action with respect to the physical environment such as moving or changing a state of an object) to improve performance of the radio network. For example, the performing the action may include one or more of the following: one or more radio network actions; one or more automated radio network actions; one or more automated radio network actions triggered by a network self-optimization algorithm; and/or one or more non-radio network actions (e.g., actions associated with the physical environment) where an object or an aspect of the physical environment is changed to improve performance of the radio network. Also, for example, the receiving, from one or more sensors, sensor data samples may include receiving sensor data samples associated with one or more of the following: a button, switch, or controller that controls an object or portion of the physical environment; a button, switch, or controller that controls a position, orientation or a movement of an object; a button, switch, or controller that controls a status or state of an object; a camera that captures images or video feed of an object or portion of a physical environment; and a sensor that detects a status or state of an object or portion of the physical environment. In a further example, the receiving sensor data associated with a sensor that detects a status or state of an object or portion of the physical environment may include, e.g., receiving sensor data from a Radar or LiDAR that performs detection, ranging, bearing or location determination of an object or portion of the physical environment.

Also, for example, the receiving radio network information associated with a radio network may include receiving at least one of the following, by way of illustrative example: a radio network key performance indicator for the radio network; information associated with a radio network action; and a radio network configuration parameter. Also, by way of example, the radio network key performance indicator may include one or more of (these are merely illustrative examples): a received signals strength; a total received power; a received interference power; and a signal to interference plus noise ratio (SINR); a pathloss; a reference signal received power; a reference signal received quality; a received signal strength indicator; a reliability; a block error rate; a latency; a jitter; a coverage; a capacity; a data transfer rate; a rank indicator; a modulation and coding scheme indicator; a channel state information; and a timing advance.

Also, according to an example embodiment, the determining one or more associated sensor and radio network information data samples may include, by way of example: determining, based on a time of one or more sensor data samples being within a time window of one or more of the radio network information data samples, one or more associated sensor and radio network information data samples. Also, the determining one or more associated sensor and radio network information data samples may include: determining that a first sensor is paired or associated with at least a first communications element; and, determining, based on a time of one or more sensor data samples from the first sensor that are within a time window of one or more of the radio network information data samples associated with at least the first communications element, one or more associated sensor and radio network information data samples. For example, the communications element may include, e.g., a computer or a server, or a radio network element associated with the radio network, including at least one of a base station (BS), a user device (or UE), a core network element, or other radio network element. Also, the selecting at least some of the one or more associated sensor and radio network information data samples that are relevant to performance of the radio network may include one or more of the following, for example: selecting at least some of the one or more associated sensor and radio network information data sample that occur or are sampled before a change in performance of the radio network; selecting at least some of the one or more associated sensor and radio network information data sample that occur or are sampled during a change in performance of the radio network; and selecting at least some of the one or more associated sensor and radio network information data sample that occur or are sampled after a change in performance of the radio network. Also, for example, the selecting at least some of the one or more associated sensor and radio network information data samples that are relevant to performance of the radio network may include one or more of: selecting at least some of the one or more associated sensor and radio network information data sample that occur or are sampled before a decrease in performance of the radio network; selecting at least some of the one or more associated sensor and radio network information data sample that occur or are sampled during a decrease in performance of the radio network; and selecting at least some of the one or more associated sensor and radio network information data sample that occur or are sampled after a decrease in performance of the radio network. Also, the method may further include labeling a reason for selection of the selected associated sensor and radio network information data samples that are relevant to performance of the radio network.

Figure 4:
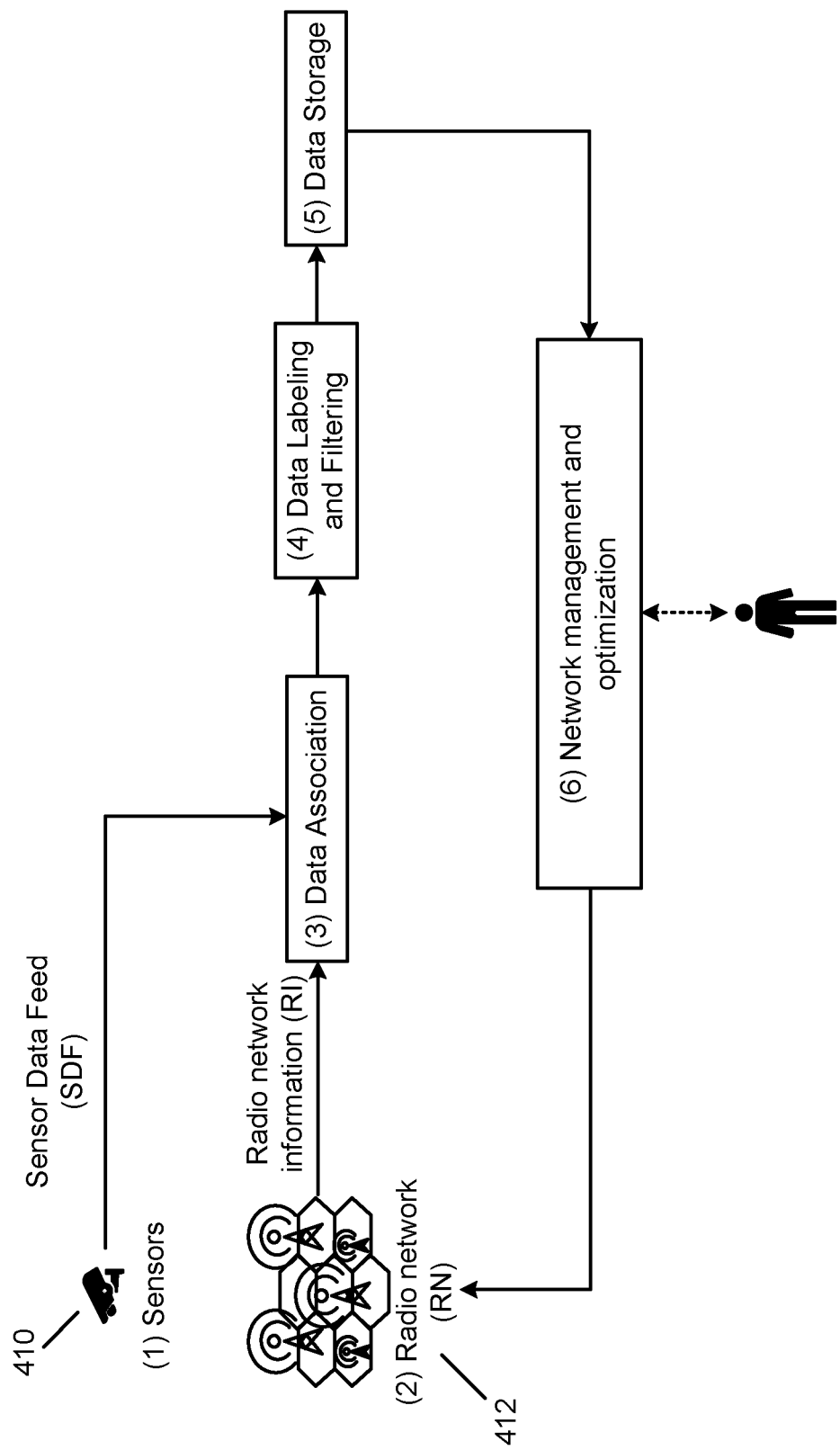
FIG. 4 is a diagram illustrating operation of a network according to an example embodiment.

FIG. 4 is a diagram illustrating operation of a network according to an example embodiment. The network in FIG. 4 may include one or more sensors 410 that may generate sensor data samples associated with a state of the physical environment, e.g., such as a location, position, orientation or other state of an object. The network may also include a radio network 412, such may include, e.g., a core network, one or more BSs, and/or one or more UEs. Radio network 412 may provide radio network information data samples that indicate a state of the radio network and/or a state of radio network performance, such as indicating a value for one or more key performance indicators for the radio network, for example. As a brief overview, the system may include or perform the following:

1) Sensors capturing spatiotemporal data from the environment
2) Radio-Network (RN) capturing RN Information (RI)
3) RI is associated with the sensor data feed (SDF)
4) The associated data samples considered to be relevant for network performance are labeled and selected from the stream of data
5) The relevant associated data samples are stored to a database or forwarded directly for further processing.
6) The associated data is input for the network management and optimization entity.
7) Furthermore, according to an example embodiment, the associated data (or ASRI data) may be input to train an AI neural network model. Once trained, subsequent ASRI data may be used to cause the AI neural network model to trigger or cause the performance of one or more preemptive corrective actions to improve the performance of the radio network.

Further example details, by way of example, are described below.

1) Sensor in this context refers to any device that can sense spatiotemporal changes of the environment. Sensors may be stationary or mobile, and one or plurality of them may co-locate as part of a larger system (e.g. various sensors located in drones, (self-driving) cars, or robots). Some, but non-limiting, examples of such sensors include;

A) buttons or switches that control the environment (e.g. a button which opens a door);

B) cameras that capture images of the environment (e.g. cameras placed at the radio installation, or even already existing surveillance camera installations); and C) lidar, radar, or any other sensor that provides detection, ranging, bearing, or location information. Lidar is a surveying method that measures distance to a target by illuminating the target with pulsed laser light and measuring the reflected pulses with a sensor. Radar may include a system for detecting the presence, direction, distance, and/or speed of aircraft, ships, and/or other objects, by sending out pulses of high-frequency electromagnetic waves that are reflected off the object back to the source.

2) RN information may include e.g., radio network key performance indicators (KPIs) for the radio network, information associated with a radio network action, and/or a radio network configuration parameter. RN KPIs may include KPIs such as throughput, latency, jitter, reliability and RN measurements (e.g., received signal strength, total received power, received interference power). RN parameters may include identifiers, configurations, or coordinates of base stations and UEs. Also, RN actions may include information related to a radio network action, such as information related to handovers, load balancing, link adaptation, cell re-selection, a change in MCS, a change in transmission power, or a change or update in any other network-related parameter.

3) The association of RI and SDF may refer, for example, to associating the two data streams in time domain; sensor feed sample SDF(k,t1) for sensor k at time t1, is associated with RN information RI(j,t2) from base station j at time t2, where time difference |t1−t2| is within time window threshold. For example, an image from a camera k captured at time t1, is associated with signal strength measurement of base station j at time t2. In a further embodiment, the association is done only for pre-configured pairs of devices (e.g. a base station is paired with cameras that capture images from area that overlaps with coverage area of the base station or coverage area of its' strongest interferers).

4) The associated data samples considered to be relevant for network performance may be selected from the stream of data. In an example embodiment, relevant data samples may include samples that impact or are associated with a change in radio network performance, such as being associated with a decrease in radio network performance. For instance, spatiotemporal changes that have impact to the radio signal propagation, e.g., moving objects impacting the radio link quality by blocking strongest path of the signal or introducing new strong radio paths (for interfering or own signal) are considered relevant. The relevancy of data sample is decided by pre-determined rules. For example, data during certain time window before and after a sudden change in the RN performance (e.g. signal strength has dropped or increased >x dBs within a short pre-defined time interval). The irrelevant data is filtered out which reduces the load of the network (computational load of the post processing applications using the data, transport load, etc.) The samples may also be labeled to indicate the reason for the selection, e.g., labeling each data sample to indicate either a pre-error label that would mean data before the error (or before the decrease radio network performance), and post-error label that would mean data after the error (or after the decrease in radio network performance).

5) The relevant associated data samples are stored to a database from which data can be fetched for later use, or they are continuously forwarded for some further processing (e.g., to optimize the network performance).

6) A network management and optimization entity may receive and/or take the associated data (or associated sensor and radio network information (ASRI)) as an input. Based on the associated data (or ASRI), actions are performed to improve RN performance. The actions can be RN actions or other actions that impact to the radio network performance e.g.:

A) Automated RN actions triggered by a network self-optimization algorithm (e.g. network self-adjusts its' parameters or triggers corrective actions);

B) Manual RN actions triggered via human interface (e.g. network parameters are adjusted via user interface of a network management system, or network deployment or configuration is adjusted manually); and C) Non-RN actions where the physical environment (or a state of the physical environment) is changed so that the RN performance is improved (e.g., an object that is deteriorating radio signal quality is shifted, moved, altered in some way, or completely removed from the environment).

7) As noted, according to an example embodiment, the associated data (or ASRI data) may be input to train an artificial intelligence (AI) neural network model. Once trained, subsequent ASRI data may be used to cause the AI neural network model to trigger or cause the performance of one or more preemptive corrective actions to improve the performance of the radio network.

Further example embodiments and example details are now described.

Figure 5:
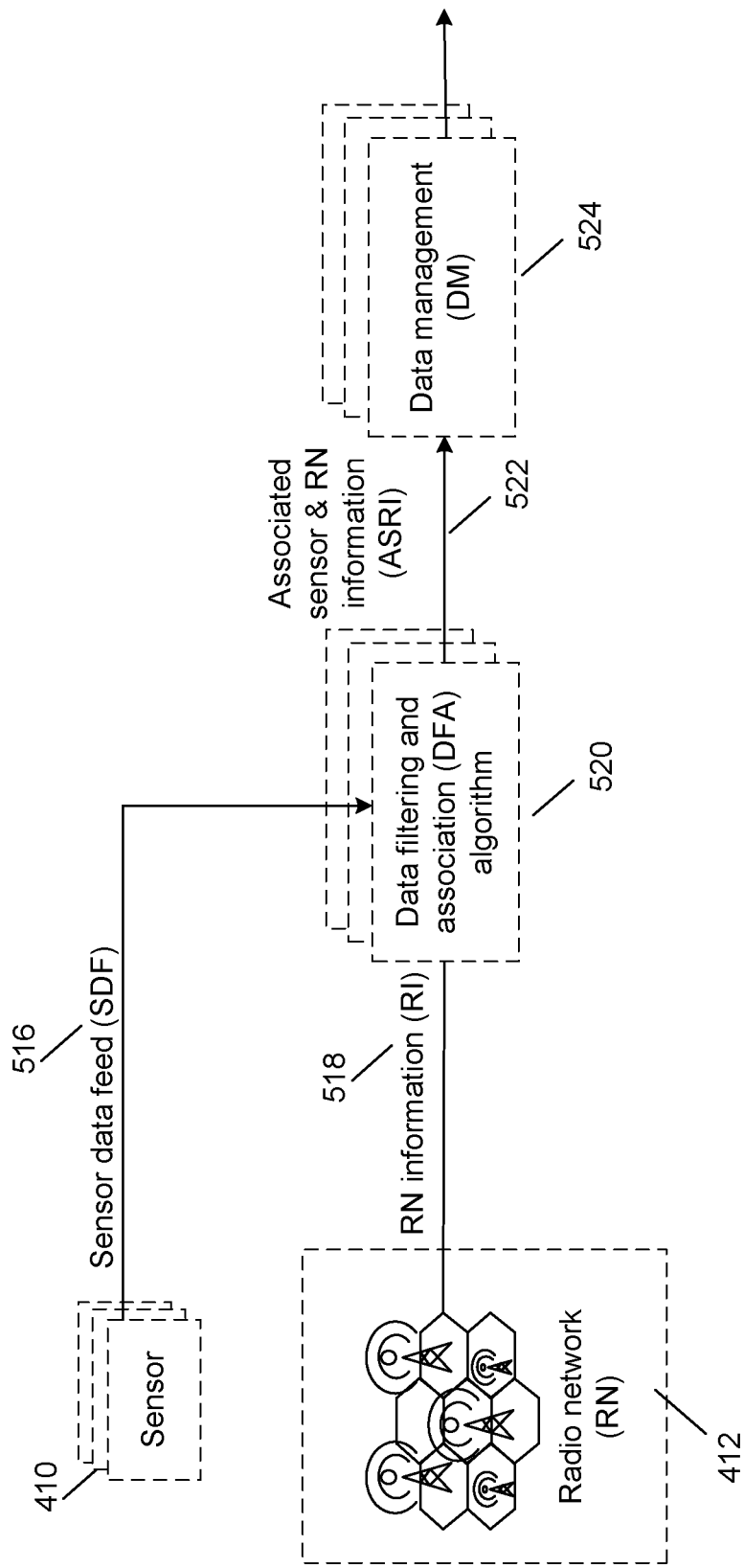
FIG. 5 is a diagram illustration associating sensor data samples with radio network information data samples according to an example embodiment.

FIG. 5 is a diagram illustration associating sensor data samples with radio network information data samples according to an example embodiment. Sensors 10 may sense or measure or identify one or more parameters associated with a physical environment. According to an example embodiment, a DFA (Data Filtering and Association) (or DFA algorithm) is the logical entity that associates the RI (radio network information) 518 and SDFs (sensor data feeds) 516. The associated data is called Associated Sensor and Radio-Network Information (ASRI) 522. The storage where ASRI data 522 samples are stored is called Data Management (DM). A sensor data feed (SDF) 516 is output from sensors 410 to DFA 520. As noted, radio network (RN) 412 may include BSs, UEs, and/or core network entities, or other radio network nodes or entities. Radio network information (RI) 518 is output from RN 412 to DFA 520.

FIG. 5 is a diagram illustrating an example embodiment of the DFA and DM. Sensors 410, and a radio network (RN) 412, a DFA 520, and a data management (DM) entity 524 are shown in FIG. 5. Measurements: Sensor Data Feed (SDF) 516 & RI (Radio-Network Information) 518 are fed (or input) to the DFA 520. Both data feeds may have their own interface specified. DFA 520 (or DFA-Algorithm 520) controls the data stream towards the Data Management (DM) 524. The DFA 520 may associate and filter the relevant data from the streams (SDF 516 and RI 518) of data that are considered to be relevant for the network performance, and also labels the data with the reason of relevancy. There can be one or more instances of the DFA 520, meaning that different data sources may be processed by different instance of DFA 520 (DFA-Algorithm) in different physical or logical locations. The DFA instances can be located e.g., in RN base stations, a Mobile Edge Computing (MEC) server or any other server or computer. The implementation of the DFA 520 (DFA-Algorithm) is implementation specific. It contains pre-programmed rules to trigger the data association.

Mobile Edge Computing (MEC) is an emerging technology in 5G era which enables, for example, the provision of the cloud and IT services or applications within the proximity of mobile subscribers. It allows the availability of the cloud or application servers in proximity to the BS (e.g., a MEC server within or as part of the BS, a MEC server provided within the enclosure(s) or building(s) where the BS equipment is located, or a MEC server very near to the BS, by way of illustrative example. For example, by providing an application on a MEC server (which may be referred to as a MEC application), the end-to-end latency perceived by the mobile user is therefore reduced with the MEC platform. MEC servers may offer other advantages as well.

With reference to FIG. 5, according to an example embodiment, Data Management (DM) 524 is a logical entity where the associated data (ASRI) 522 may be sent to. The DM 524 may have one or more of the following functionalities, by way of example: data storage, instant forwarding of the incoming data, forwarding of the stored data (e.g., ASRI data). This entity is optional in a sense that the ASRI data 522 can be forwarded directly to any entity that can understand the protocol which is used to transmit the ASRI data 522. Like with the DFA 520, the architecture can be distributed or central, meaning that the data (e.g., ASRI data) streams from DFA (DFA-Algorithm) 520 instances can be connected to one or more instances of DMs 524 in different physical or logical locations.

DFA

This sub-section describes the high-level view of the DFA 520. DFA (Data-Filtering-and-Association) 520 associates the data from the radio network and sensors, and filters and labels the relevant data from the stream of data that are considered to be relevant for the network performance There can be several instances of the DFA 520 in different logical or physical locations, meaning for instance that some sensors are connected to DFA instance inside RN base stations while rest of the sensors are connected to different DFA-Instances inside a MEC server. To allow this type of implementation, several interface protocols needs to be defined. This should also allow implementation in a multi-vendor network.

Figure 6:
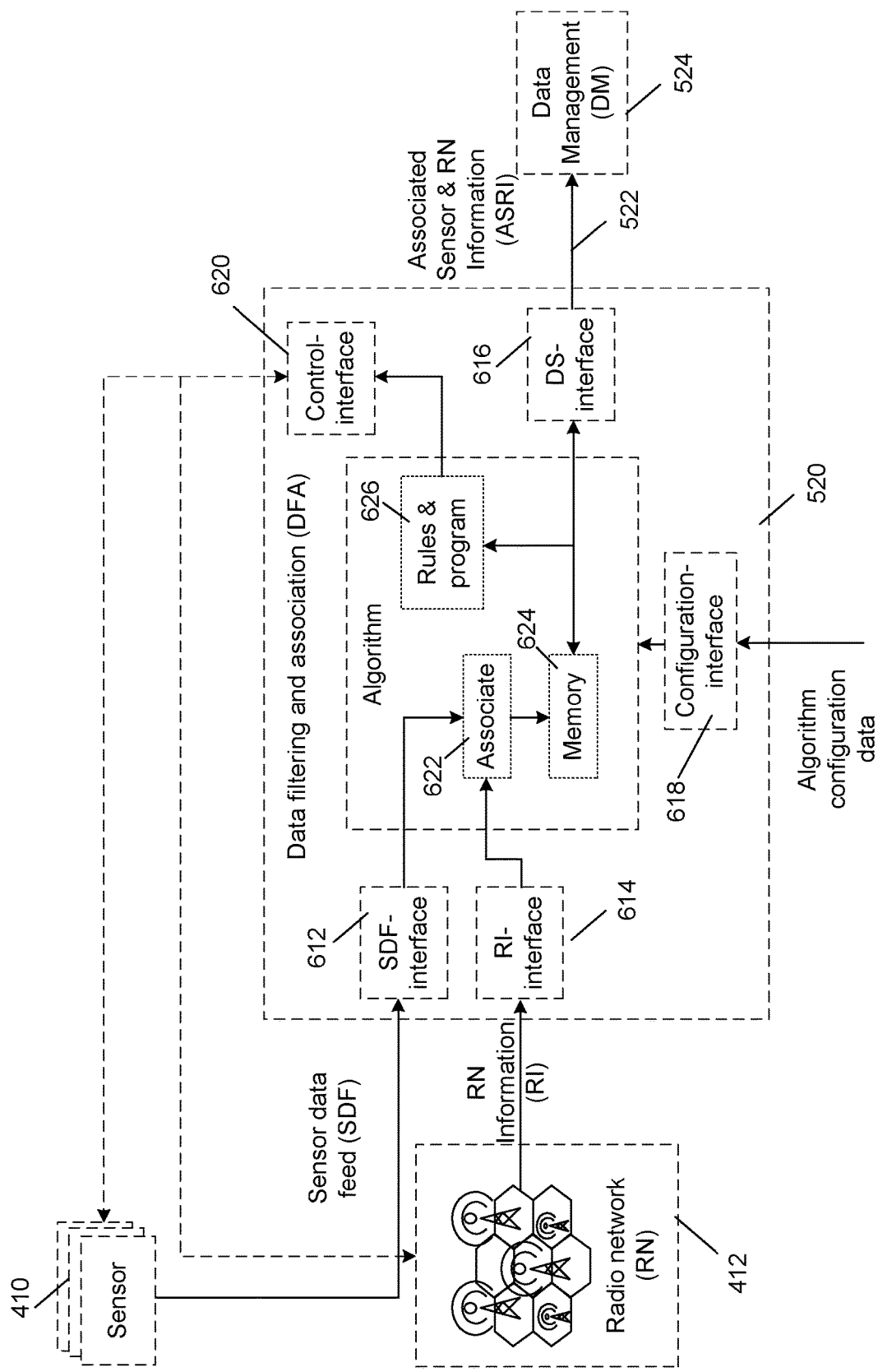
FIG. 6 is a diagram illustrating a Data-Filtering-and-Association (DFA) according to an example embodiment.

FIG. 6 is a diagram illustrating a Data-Filtering-and-Association (DFA) according to an example embodiment. SDF (sensor data feed)-Interface 612 defines a protocol to transfer sensor data. The protocol may e.g., indicate the type of data, time stamp of each data sample, etc. RI-Interface 614 defines a protocol to transfer of radio network information (RI). The protocol may, for example, indicate the type of data, time stamp for each data sample, etc. DS-Interface 616 defines a protocol to transfer ASRI information to the DM 524. Configuration-Interface 618 defines a protocol to configure the operation or algorithm of DFA 520, e.g., based on DFA algorithm configuration data. Through this interface 618, custom data association algorithms or rules can be implemented in each DFA 520 instance. Control-Interface 620 defines a protocol to send instructions from a set of pre-defined instructions to control or provide feedback to sensors 410 and/or 412. For instance, instead of continuously transmitting the SDF, when RI indicates an error in the network (e.g., which, in some cases, may be a decreased radio network performance), the interface 620 may be used to instruct a sensor to transmit the SDF of previous 10 seconds and the next 10 seconds. This saves transmission bandwidth since the sensors stream the data only when needed. In addition, the interface 620 may be used to control the data stream from the radio network.

According to an example embodiment, DFA (or DFA Algorithm) 520 may include three example functions or components, which may include: 1) Associate function 622 may perform association of the SDF and RI data. In a simple example embodiment DFA 520 (e.g., associate 622) may associate data samples (associate sensor data samples and radio network information data samples) that arrive within a certain time window. Thus, data association may be performed by DFA 520 based on a time relationship of sensor data samples and RI samples, e.g., that arrive or have a time stamp within a time threshold. Such implementation is sufficient as long as it can be guaranteed that delivery of the data does not have excessive delays. To achieve more precise synchronization (e.g. millisecond level) between association of SDF and RI, separate solutions may be needed. Simple example could be to add GPS timestamp to the SDF and RI interface protocols. In the absence of GPS, some external synchronization method could be utilized like Synchronous Ethernet. 2) Memory 624 of DFA 520 may store ASRI data samples. Thus, DFA memory 624 may include a memory to store N latest ASRI samples. The history of samples may be used by DFA 520 to obtain information prior the event that triggered the data association. 3) Rules & program 626 of DFA 520 may include a set of rules, or a program, to trigger the association inside the own DFA instance 520, or to trigger association in another DFA instance through the control interface 620. Rules and program 626 may also specify which ASRI samples are stored to the memory and which samples are sent to the DM 524. The rules can be configured or a separate program downloaded through the configuration interface 618. The rules may include separate rules for different destinations receiving the associated data, for instance; one destination receives filtered data specified by one rule while other destination receives the raw data without filtering. Obviously, this can be achieved with separate DFA instances as well.

Data Management

Figure 7:
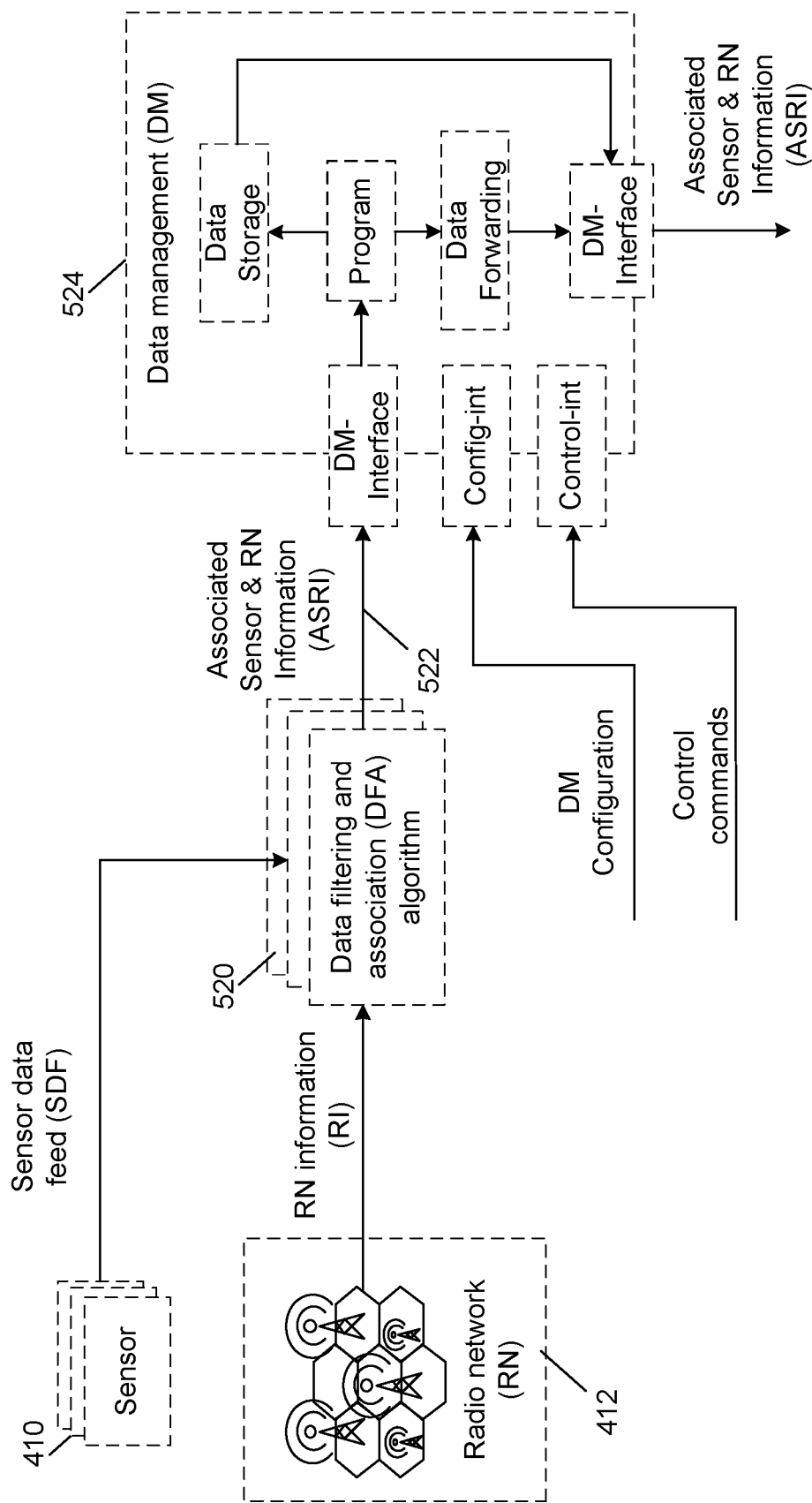
FIG. 7 is a diagram of a data management entity according to an example embodiment.

FIG. 7 is a diagram of a data management entity according to an example embodiment. The role of DM (Data Management) may include, for example: Receive the ASRI, store the ASRI, and/or forward the received ASRI. Fetch and send the ASRI from the memory to a given destination on demand. DM-Interface(s) 716 defines an interface protocol to transfer ASRI-data to and/or from DM 524. Data Storage 712 is a logical entity that stores the ASRI, e.g., within a database. Program part 714 is specified by the configuration interface and it determines which ASRI samples are stored and which ASRI samples are forwarded (e.g. data from source A may be configured to be stored while the data from source B is forwarded to a predefined destination, with or without storing the data first). Data forwarding 718 may determine which data samples are forwarded. Configuration Interface 720 defines a protocol to configure the DM 524. The configuration may include, e.g., data forwarding rules for specific sources. Control Interface 722 defines a protocol to fetch data or information from the storage.

Figure 8:
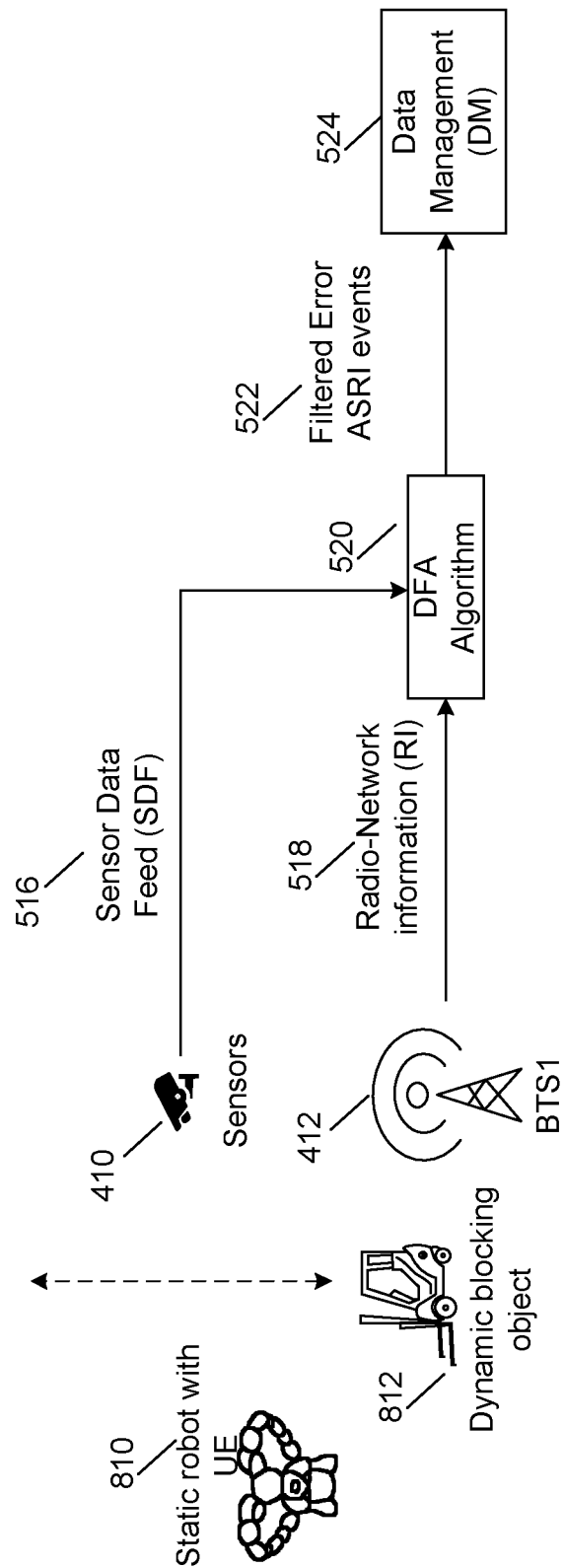
FIG. 8 is a diagram illustrating a robot 810 with a user equipment (UE), and a dynamic or moving blocking object 812 that impacts radio network performance for the UE.
Figure 9:
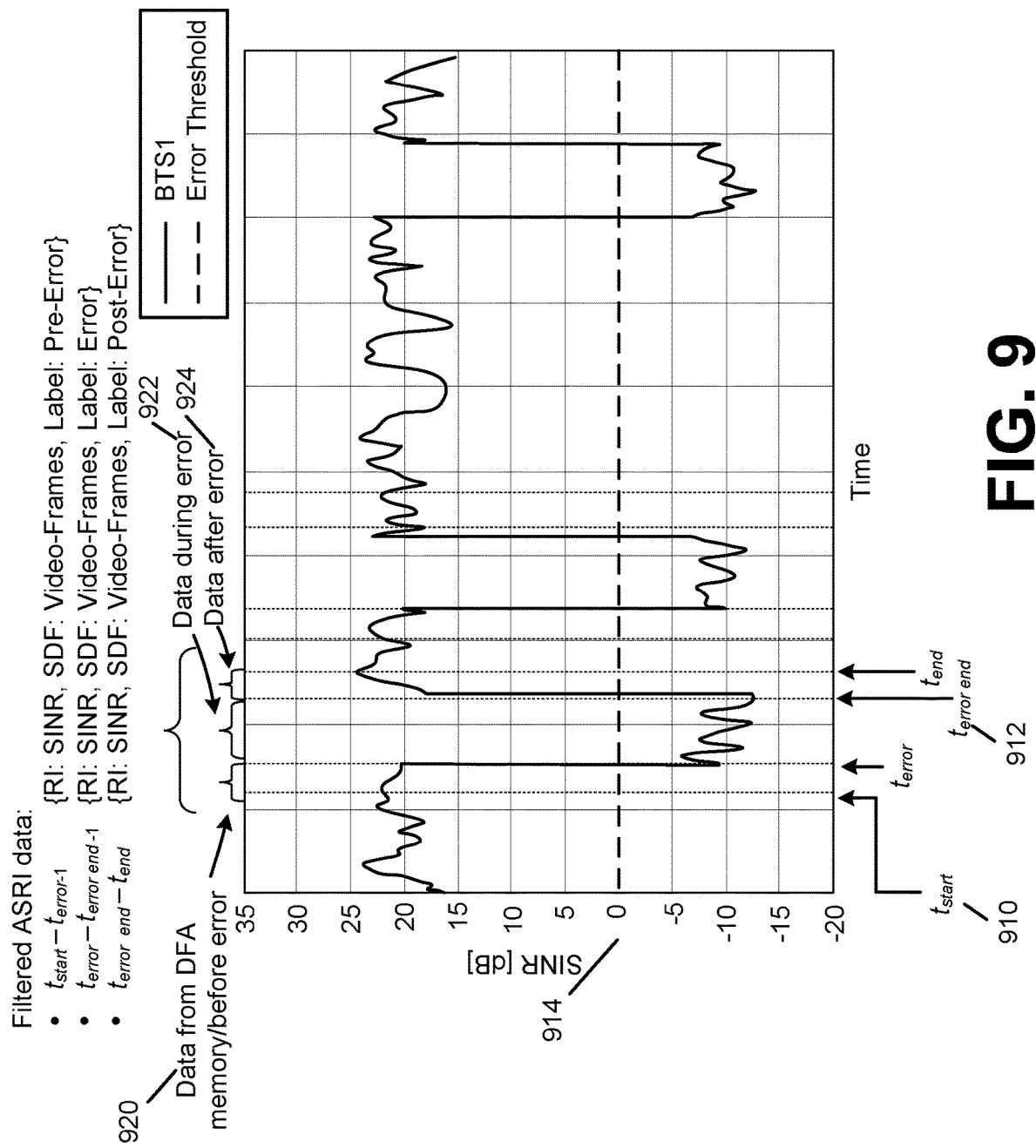
FIG. 9 is a diagram illustrating radio network information (RI) for a time period that is before an error, during an error, and after an error.

FIG. 8 is a diagram illustrating a robot 810 with a user equipment (UE), and a dynamic or moving blocking object 812 that impacts radio network performance for the UE. FIG. 9 is a diagram illustrating radio network information (RI) for a time period that is before an error, during an error, and after an error. As shown in FIG. 8, a dynamic object 812 in a factory randomly blocks the signal between robot-UE 810 and BTS1 412. When the object 812 is blocking the radio signal, SINR drops below a threshold, which may be considered an error (FIG. 9). DFA instance 520 is configured to monitor the error event (e.g., monitor SINR, including when SINR drops below threshold 914, FIG. 9) caused by the blockage. Sensor data feed 516 is video images provided by a camera attached to the BTS1. When the RI (radio network information) (e.g., SINR) indicates the error (e.g., when SINR drops below threshold 914, FIG. 9), the data association is triggered between the video images (SDF) and SINR (RI). The data (ASRI) before the error/event (920) is fetched from the DFA memory and is forwarded with the data (ASRI samples) during (922) the error and the data (ASRI samples) (924) after the error event. Before sending the ASRI samples, the samples are labelled to indicate which event triggered the association, and the state of the error (pre-error—error—post-error). The data association is ended according to a preconfigured rule being in this case some time interval after the error has ended. This data is forwarded for the DM 524 that is visualized in FIG. 9 as bursts of data from the three detected errors. As shown in FIG. 9, data samples are shown for time periods before the error (920), during the error (922) and after the error (924). Also as shown in FIG. 9, the ASRI (associated SINR data and video frames) are filtered and provided as: pre-error ASRI; ASRI during error, and ASRI post-error. Note, that the term error in this example indicates that a signal (e.g., SINR) has crossed a specific threshold, e.g., SINR has dropped below threshold 914.

Figure 10:
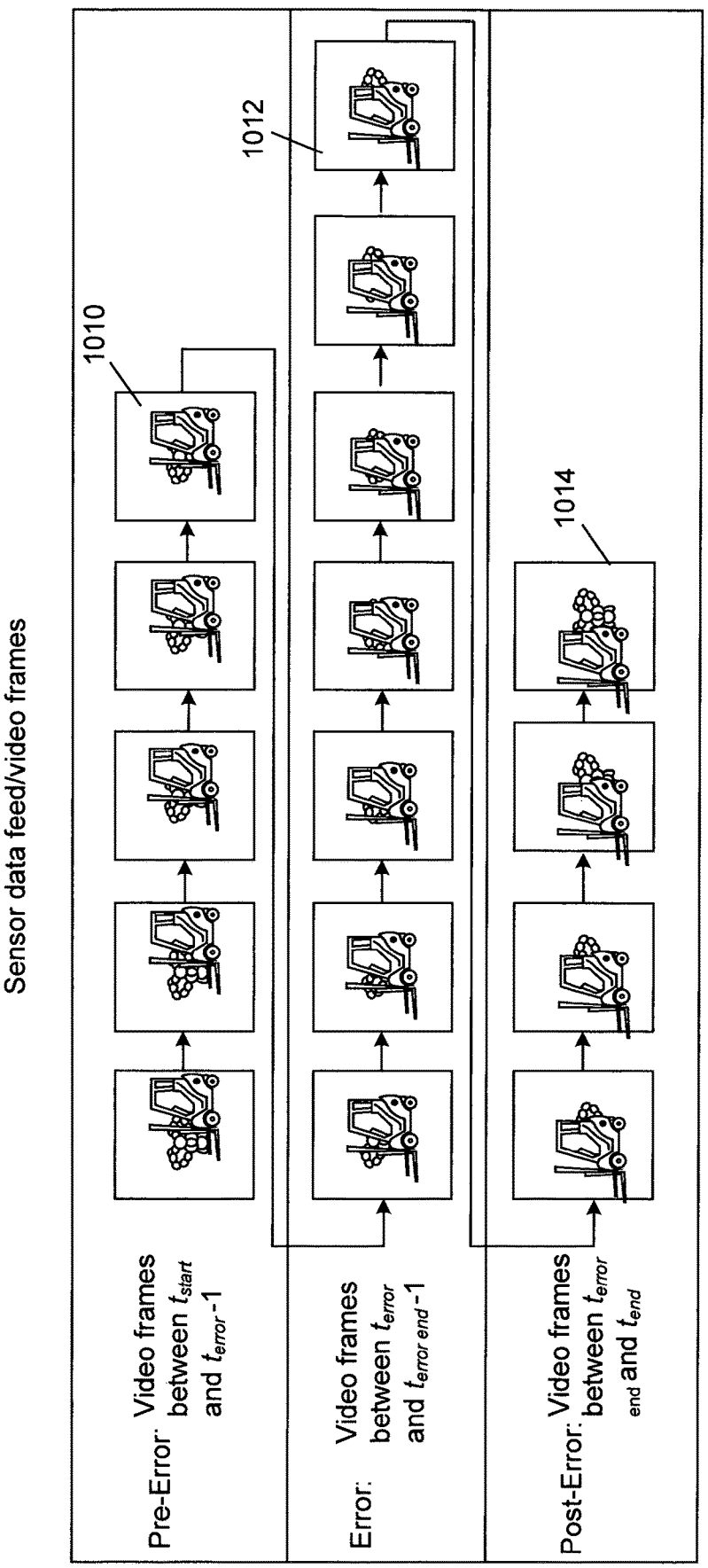
FIG. 10 illustrates video frames of video of the dynamic blocking object within pre-error, error and post-error locations.
Figure 11:
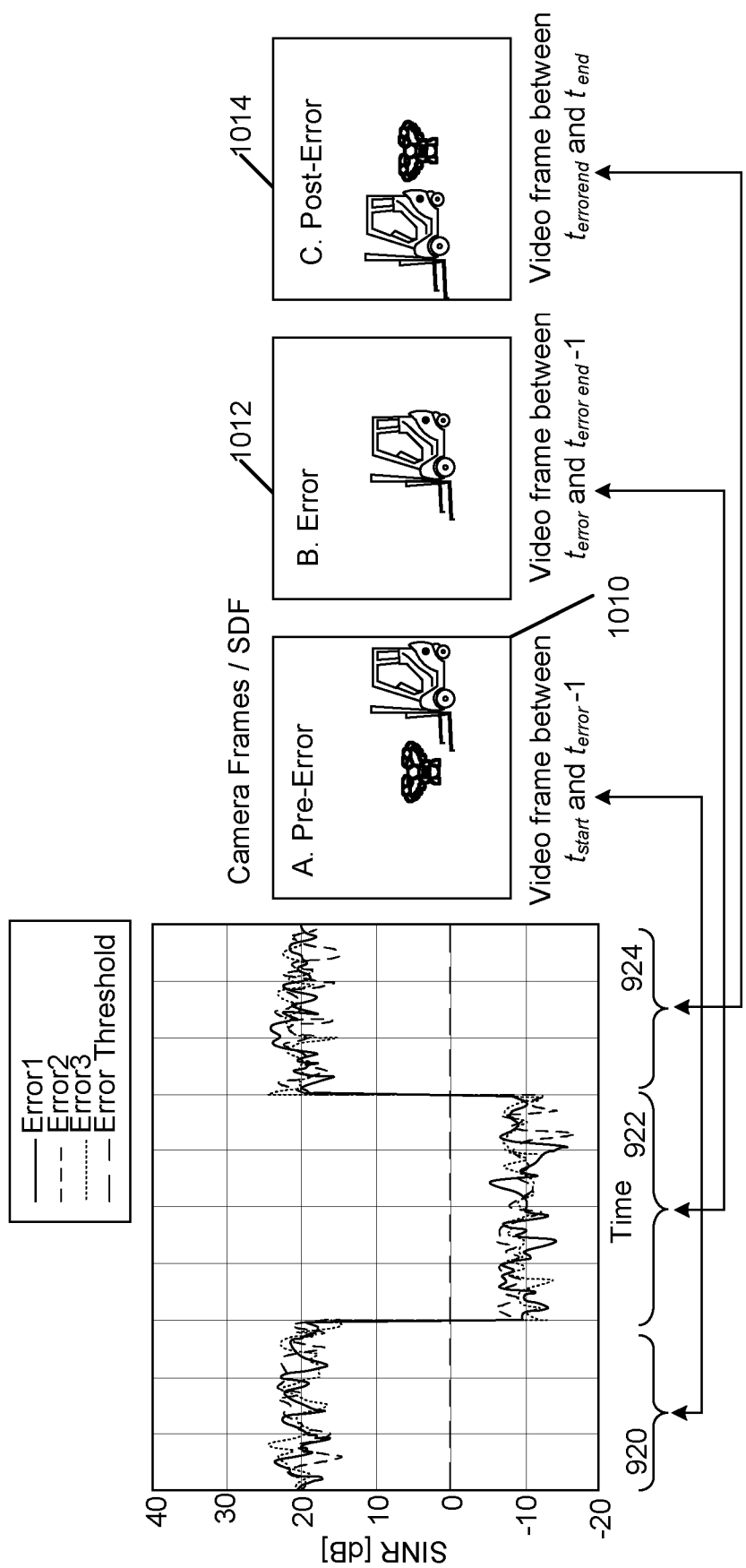
FIG. 11 is a diagram illustrating data that is forwarded or received for pre-error, error and post-error times, associated with different video frames.

The data association and labelling are further demonstrated with FIGS. 9 and 10. FIG. 11 is a diagram illustrating data that is forwarded or received for pre-error, error and post-error times, associated with different video frames. As shown in FIG. 9, an error event occurs when the SINR drops below the threshold 914. As noted, this may occur when the dynamic blocking object 812 is within a specific range of locations or positions. FIG. 10 illustrates video frames of video of the dynamic blocking object 812 within pre-error locations 1010 (e.g., video frames of object 812 prior to the error condition); during the error 1012 (e.g., video frames of object 812 when the SINR of UE is below threshold 914, or during error condition); and after the error condition 1014 (video frames of object 812 after the error condition). Thus, video frames at 1010 shown that before the error the dynamic object 812 is approaching; video frames at 1012 show that during the error the dynamic object 812 is in front of the UE; and video frames at 1014 show that after the error the object 812 is moving further away. In this illustrative example, the error events caused by the blockage show similar behavior with the SINR and video frames. This is demonstrated with FIG. 11 showing the typical video frames before-during-after the error and the SNR curves aligned based on the video images. This figure demonstrates that storing this type of data stores information that may be related to the root cause of the error caused by the signal blockage.

There are several different deployment options. The options may be described by the physical or logical locations of the sensors, DFA-Algorithm instances and DM instances. Each of the mentioned can be integral and/or external part of the RN. This means that the number of deployment options is very large and therefore only a few example deployments are demonstrated here, by way of illustrative example.

Figure 12:
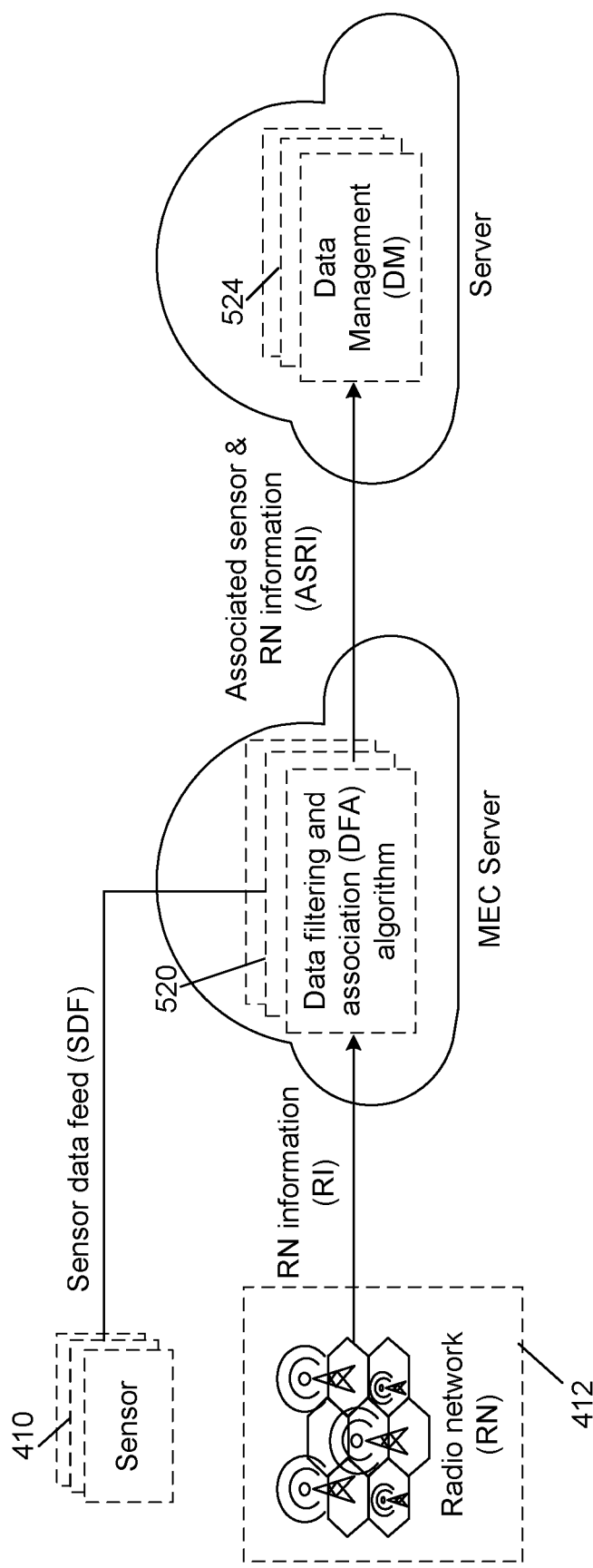
FIG. 12 is a diagram illustrating a deployment option where the DFA-Algorithm is inside a Multi-Access Edge Cloud (MEC) server.
Figure 13:
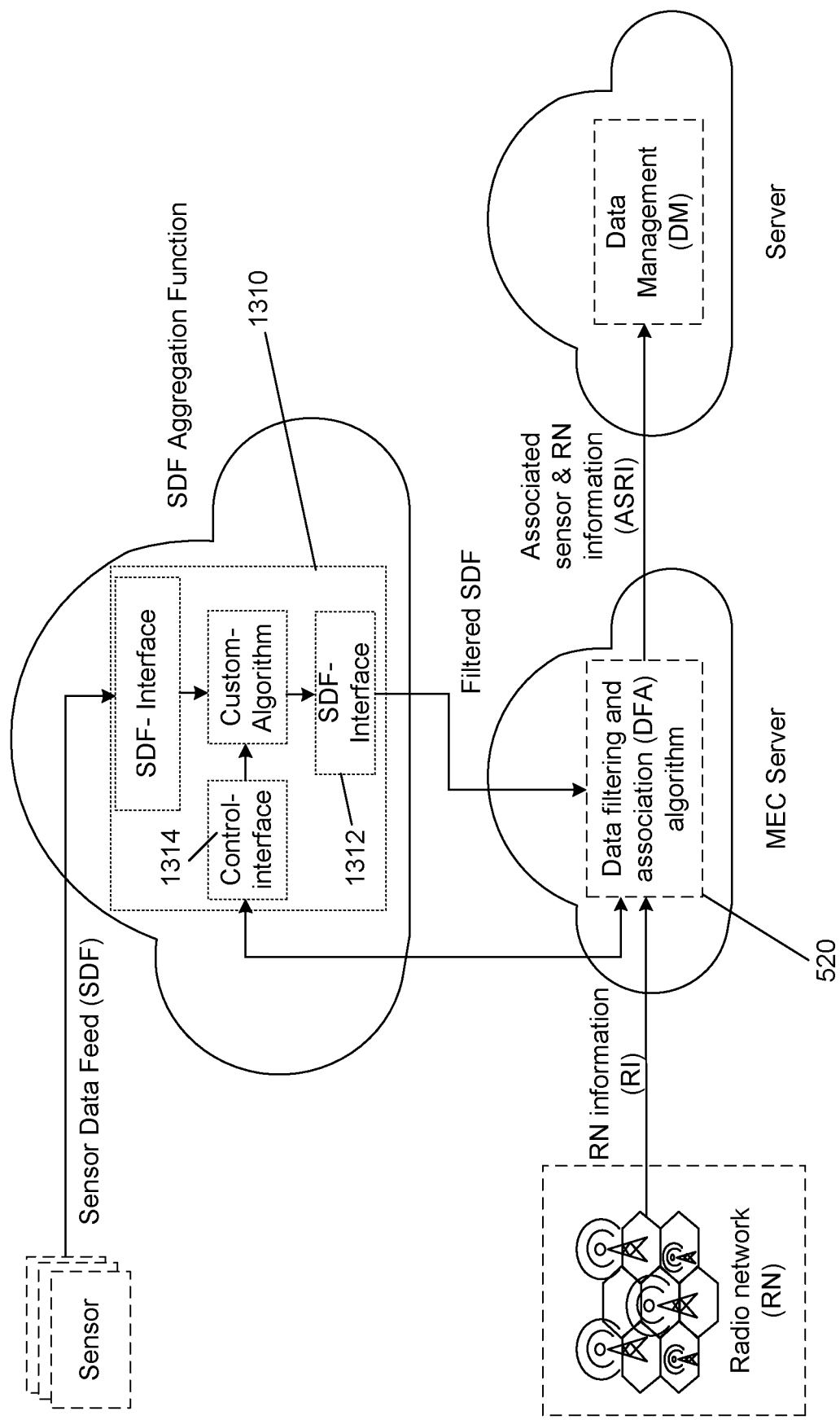
FIG. 13 is a diagram illustrating a similar deployment as with FIG. 12, with a difference that the sensor data is aggregated to a SDF Aggregation Function.

FIG. 12 is a diagram illustrating a deployment option where the DFA-Algorithm 520 is inside a Multi-Access Edge Cloud (MEC) server. The RI and SDF are continuously fed for the DFA instance. FIG. 13 is a diagram illustrating a similar deployment as with FIG. 12, with the difference that the sensor data is aggregated to a SDF Aggregation Function 1310 which forwards the SDFs when requested by the DFA-Instance 520. This approach demonstrates at least two benefits compared to the example, of FIG. 12: Sensors do not have to implement the SDF interface, and the SDF aggregation function 1310 can forward the SDFs over the SDF-Interface 1312. The control interface 1314 can be used to reduce the amount of data from SDFs to save transmission bandwidth. This can be done by sending a control message by the DFA-Algorithm 520 when the data is needed for association.

Figure 14:
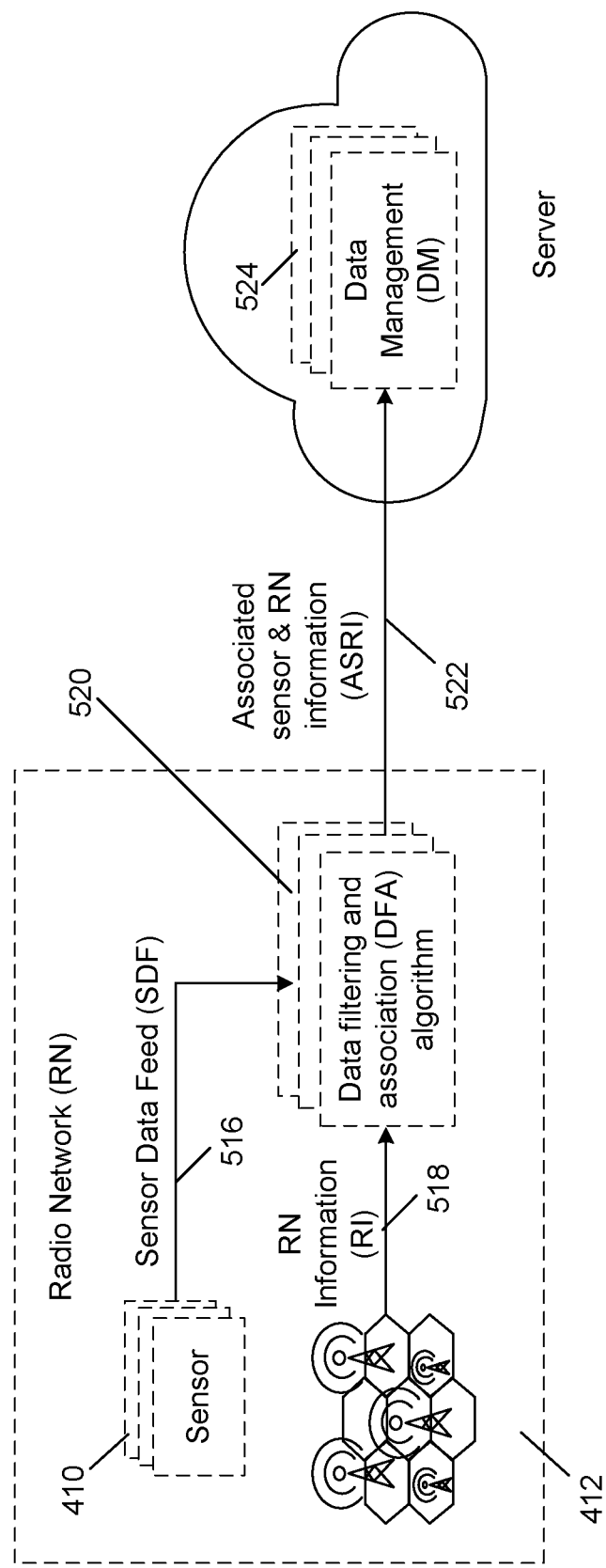
FIG. 14 is a diagram shows deployment option where the sensors and DFA-Algorithm instances 520 are inside the radio network (RN) 412.

FIG. 14 is a diagram shows deployment option where the sensors and DFA-Algorithm instances 520 are inside the radio network (RN) 412. Sensor data feed 516 and RI data samples 518 are shown. For instance, cameras (example sensors) could be integrated to base stations (BSs, within the RN 412) and each base station may have DFA-Algorithm instance 520 which forwards ASRI data 522 to the DM 524 outside RN. Advantages of this approach may include the possibility of tight synchronization in the association of sensor data and radio network information, and access to sensitive information inside the base station or RN.

In yet a further example embodiment, an artificial intelligence (AI) neural network (e.g., which may be referred to as an AI neural network mode, a neural network, a neural network model or a model) may be used to improve performance of the radio network. Neural networks are computational models used in machine learning made up of nodes organized in layers. The nodes are also referred to as artificial neurons, or just neurons, and perform a function on provided input to produce some output value. A neural network requires a training period to learn the parameters, i.e., weights, used to map the input to a desired output. The mapping occurs via the function. Thus, the weights are weights for the mapping function of the neural network. Each neural network model may be trained for a specific task. According to an example embodiment, one task may include improving the performance of a radio network (or at least decreasing a reduction in radio network performance). The task performed by the neural network model is determined by the inputs provided, the mapping function, and the desired output.

To provide the output given the input, the neural network must be trained, which may involve learning the proper value for a large number of parameters for the mapping function. The parameters are also commonly referred to as weights as they are used to weight terms in the mapping function. This training is an iterative process, with the values of the weights being tweaked over thousands of rounds of training until arriving at the optimal, or most accurate, values. In the context of neural networks, the parameters are initialized, often with random values, and a training optimizer iteratively updates the parameters, also referred to as weights, of the network to minimize error in the mapping function. In other words, during each round, or step, of iterative training the network updates the values of the parameters so that the values of the parameters eventually converge on the optimal values.

Training can either be supervised or unsupervised. In supervised training, training examples are provided to the neural network. A training example includes the inputs and a desired output. Training examples are also referred to as labeled data because the input is labeled with the desired output. The network learns the values for the weights used in the mapping function that most often result in the desired output when given the inputs. In unsupervised training, the network learns to identify a structure or pattern in the provided input. In other words, the network identifies implicit relationships in the data. Unsupervised training is used in deep neural networks as well as other neural networks and typically requires a large set of unlabeled data and a longer training period. Once the training period completes, the neural network can be used to perform the task it was trained for.

Also, in some example neural network models, learning may be performed by the neural network model based on data, and a cost function, or a reward function. For example, a cost function may provide a measure or indication of how far away a particular solution is from an optimal (or desired) solution to a problem to be solved. Whereas, a reward or reward function may indicate that an output is closer to a desired or optimal solution. For example, in the case of attempting to improve radio network performance, a cost function may indicate how far away a radio network performance (e.g., resulting from a set of associated sensor and radio network information data samples) is from a desired or optimal solution. For example, a desired or optimal solution in the example of improving radio network performance (or at least attempting to avoid or reduce a decrease in radio network performance), may be indicated as a solution that may improve (e.g., maximizes) one or more radio network key performance indicators (e.g., improves or maximizes SINR, error rate, received signal strength, of signals received by the UE . . . ). A reward or reward function may be used to indicate, for example, an output that has increased or decreased radio network performance (e.g., +1 may be used to indicate that a set of input data resulted in an increase in radio network performance, and a −1 may be used to indicate that a set of data resulted in a decrease in radio network performance, in order to train the model).

According to an example embodiment, the learning or training of a neural network model may be classified into two broad categories (supervised and unsupervised), depending on whether there is a learning "signal" or "feedback" available to a model. Thus, for example, within the field of machine learning, there may be two main types of learning or training of a neural network model: supervised, and unsupervised. The main difference between the two types is that supervised learning is done using known or prior knowledge of what the output values for our samples should be. Therefore, the goal of supervised learning is to learn a function that, given a sample of data and desired outputs, best approximates the relationship between input and output observable in the data. Unsupervised learning, on the other hand, does not have labeled outputs, so its goal is to infer the natural structure present within a set of data points.

Supervised learning: The computer is presented with example inputs and their desired outputs, and the goal may be to learn a general rule that maps inputs to outputs. Supervised learning may, for example, be performed in the context of classification, where a computer or learning algorithm attempts to map input to output labels, or regression, where the computer or algorithm may map input(s) to a continuous output(s). Common algorithms in supervised learning may include, e.g., logistic regression, naive bayes, support vector machines, artificial neural networks, and random forests. In both regression and classification, a goal may include to find specific relationships or structure in the input data that allow us to effectively produce correct output data. As special cases, the input signal can be only partially available, or restricted to special feedback: Semi-supervised learning: the computer is given only an incomplete training signal: a training set with some (often many) of the target outputs missing. Active learning: the computer can only obtain training labels for a limited set of instances (based on a budget), and also has to optimize its choice of objects to acquire labels for. When used interactively, these can be presented to the user for labeling. Reinforcement learning: training data (in form of rewards and punishments) is given only as feedback to the program's actions in a dynamic environment, e.g., using live data.

Unsupervised learning: No labels are given to the learning algorithm, leaving it on its own to find structure in its input. Some example tasks within unsupervised learning may include clustering, representation learning, and density estimation. In these cases, the computer or learning algorithm is attempting to learn the inherent structure of the data without using explicitly-provided labels. Some common algorithms include k-means clustering, principal component analysis, and autoencoders. Since no labels are provided, there is no specific way to compare model performance in most unsupervised learning methods.

Figure 15:
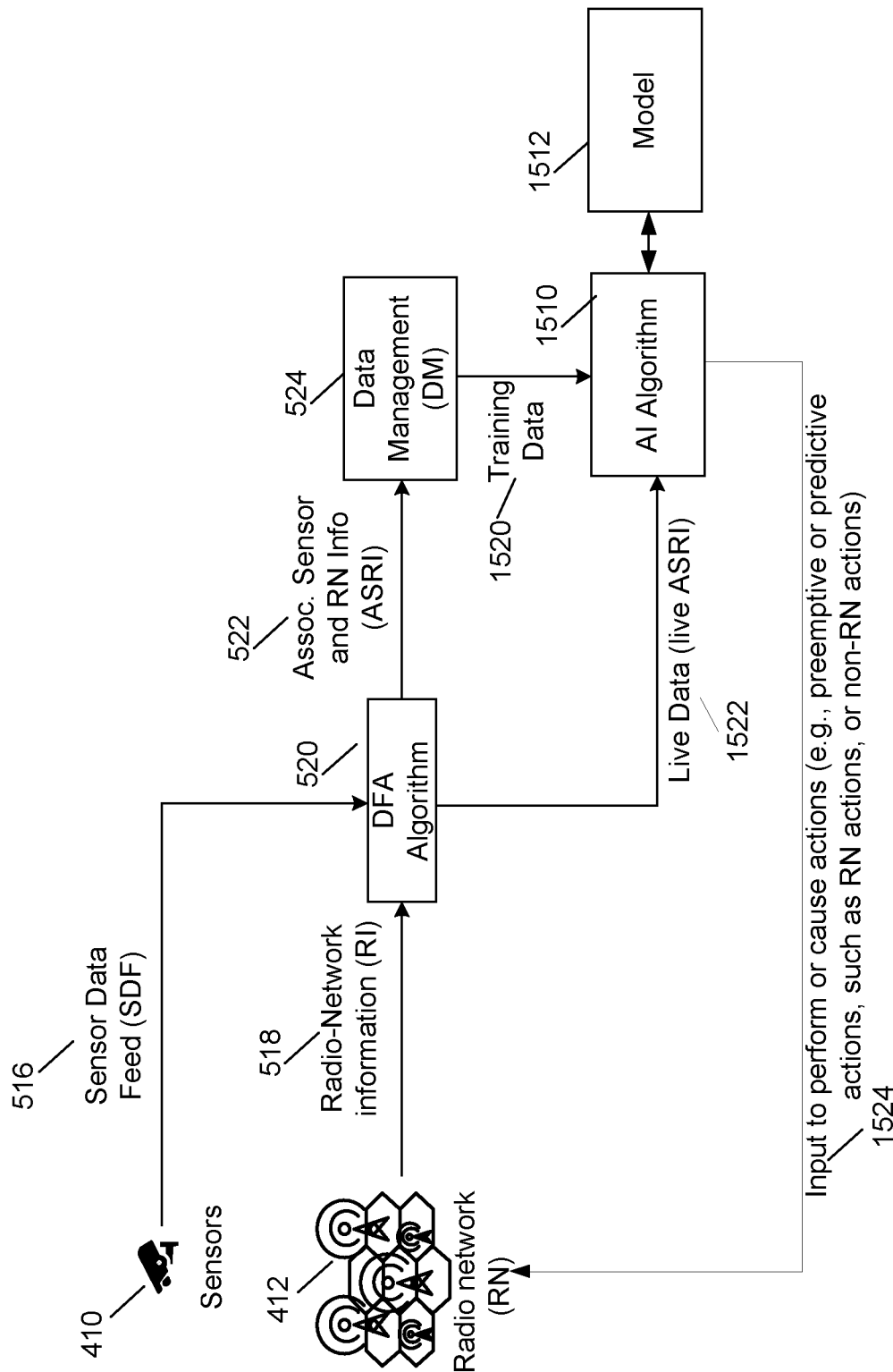
FIG. 15 is a diagram illustrating a system that uses an artificial intelligence algorithm to train a neural network model, and then use the neural network model to improve the operation of a radio network, according to an example embodiment.

FIG. 15 is a diagram illustrating a system that uses an artificial intelligence algorithm to train a neural network model, and then use the neural network model to improve the operation of a radio network, according to an example embodiment. Many of the blocks shown in FIG. 15 are similar to FIG. 5, and other FIGs here. To briefly review, sensors 10 may sense or measure or identify one or more parameters associated with a physical environment. According to an example embodiment, a DFA (Data Filtering and Association) (or DFA algorithm) 520 is the logical entity that associates the RI (radio network information) 518 and SDFs (sensor data feeds) 516. The associated data is called Associated Sensor and Radio-Network Information (ASRI) 522. The storage where ASRI data 522 samples are stored is called Data Management (DM) 524. A sensor data feed (SDF) 516 is output from sensors 410 to DFA 520. As noted, radio network (RN) 412 may include BSs, UEs, and/or core network entities, or other radio network nodes or entities. Radio network information (RI) 518 is output from RN 412 to DFA 520. The DFA 520 may associate and filter the relevant data from the streams (SDF 516 and RI 518) of data that are considered to be relevant for the network performance, and may label the data with the reason of relevancy.

Also, as shown in FIG. 15, an artificial intelligence (AI) algorithm 1510, which may be running on one or more computers or servers, may receive training ASRI data 1520, and may train a neural network model 1512. Various types of training or learning may be used to train the model 1512, e.g., such as supervised learning, unsupervised learning, and reinforcement learning, as examples. In an illustrative example, a first set of ASRI data (e.g., training data 1520) may be used by AI algorithm 1510 to train model 1512. Then, a second set of data (e.g., live data or live ASRI) 1522 may be used by AI algorithm, based on the trained model 1512, to perform (or cause another entity to perform) one or more actions that may improve the performance of radio network 412. Thus, a two-part (or multi-step) process may be employed that may include, e.g.: 1) a training process in which AI algorithm 1510 trains the neural network model 1512; and 2) a radio network (RN) optimization process, e.g., in which further ASRI data (e.g., live ASRI data 1522) may be received by AI algorithm 1510 and used to perform (or trigger or cause another entity to perform) one or more actions to improve the performance of radio network 412. According to an example embodiment, the actions performed may include radio network actions and non-radio network actions. Also, in some cases, the actions may be predictive actions or preemptive actions, e.g., which may preemptively attempt to improve a radio network performance, based on the trained model and the live ASRI data. For example, preemptive actions may include one or more radio network actions and/or one or more non-radio network actions that may be designed (or estimated) to improve radio network performance or at least reduce a decrease in performance (e.g., an expected or predicted decrease in RN performance) of the radio network based on the trained model 1512 and the live data or live ASRI data 1522.

Performing an action or causing another entity to perform an action may include, e.g., one or more of: performing or causing another entity to perform one or more radio network actions; providing one or more input parameters to a network optimization entity or another entity; performing or causing another entity to perform one or more non-radio network actions where an object or an aspect of a physical environment is changed. Performing or causing another entity to perform one or more non-radio network actions where an object or an aspect of a physical environment is changed may include performing or causing another entity to perform a change in a position, location, orientation, speed and/or movement of an object (e.g., robot, wall, or any other object or portion of a physical environment) that impacts performance of the radio network.

Also, performing (or causing another entity to perform) a radio network action (e.g., to improve performance of the radio network), may include, e.g., performing (or causing another entity to perform) a radio network action related to at least one of the following: a handover of a user device to a target base station; a load balancing of traffic or data between two or more base stations; a link adaptation for a radio link between a base station and a user device; a cell selection or cell reselection performed by a user device; a scheduling; a resource allocation; a transmit power control; and a timing advance adjustment.

Furthermore, the system may also perform the following: determining a resulting change in a performance of the radio network in response to the one or more radio network actions and/or one or more non-radio network actions; determining a reward associated with the performed one or more radio network actions and/or performed one or more non-radio network actions, wherein the reward is based on whether the performed one or more radio network actions and/or performed one or more non-radio network actions results in or is associated with an increase or decrease in performance of the radio network. Also, for example, the improving performance of the radio network may include outputting at least one of the following: a key performance indicator (KPI) of the radio network for a next data sample; and an estimated best action and/or probability distribution over available actions or an estimated reward for each of one or more actions, using one or more of Q-Learning, policy gradient, or actor-critic algorithms.

Also, for example, the neural network model may estimate a state transition function between inputs (e.g., ASRI data) that include a plurality of associated sensor and radio network information data samples before time t and outputs that include one or more predicted sensor data samples and/or one or more predicted radio network information data samples after time t.

In another example embodiment, the system may perform the following after training of the neural network model: determining a predicted future state of the radio network based on the second set of one or more associated sensor and radio network information data samples and the model: determining that the predicted future state of the radio network indicates that a predicted performance of the radio network is expected to be below a threshold; and, performing at least one of the following to improve performance of the radio network: 1) providing information, including the predicted future state of the radio network to a network optimization entity; 2) performing or causing another entity to perform a non-radio network action; and 3) performing or causing another entity to perform a radio network action.

Also, in an example embodiment, the receiving, from one or more sensors, sensor data samples may include receiving sensor data samples associated with one or more of the following: 1) a button, switch, or controller that controls an object or portion of the physical environment; 2) a button, switch, or controller that controls a position, location, orientation or a movement of an object; 3) a button, switch, or controller that controls a status or state of an object; 4) a camera that captures images or video feed of an object or portion of a physical environment; and 5) a sensor that detects a status or state of an object or portion of the physical environment. Also, for example, the receiving radio network information data samples associated with a radio network may include receiving at least one of the following: 1) a radio network key performance indicator for the radio network; 2) information associated with a radio network action; and 3) a radio network configuration parameter. For example, a radio network key performance indicator may include (by way of illustrative examples) one or more of: a received signals strength; a total received power; a received interference power; and a signal to interference plus noise ratio (SINR); a pathloss; a reference signal received power; a reference signal received quality; a received signal strength indicator; a reliability; a block error rate; a latency; a jitter; a coverage; a capacity; a data transfer rate; a rank indicator; a modulation and coding scheme indicator; a channel state information; and a timing advance.

Referring again to the system of FIG. 15, AI algorithm 1510 may be used to train a neural network model 1512 (e.g., based on a first set of ASRI data or training data), and then the AI algorithm 1510, based on the trained model 1512, may determine actions to be performed and/or output control information 1524 to perform (or cause another entity to perform) one or more actions to improve performance of the radio network.

According to an illustrative example embodiment, the radio network may perform predictive (or preemptive) self-optimization by artificial intelligence algorithm 1510 that may use radio network KPIs & parameters and data from sensors that sense spatiotemporal changes from the environment (e.g., ASRI data), to learn correlating patterns among them (e.g., patterns of behavior that are typically correlated, between the sensor data and the associated radio network information). By feeding the live sensor data and live radio network information data to the AI algorithm 1510, radio network performance is improved by performing an action from a set of actions which is considered to (e.g., most likely to) improve the radio network performance the most given the recent data from sensors and radio network (e.g., based on the trained neural network model 1512). The AI algorithm 1510 and associated neural network model 1512 may be trained with recordings (stored data) of sensor data and radio network information data that have led to events relevant for the radio network performance. Alternatively, the AI algorithm 1510 may be trained directly with the live data feed 1522. Based on a high-quality training data (high quality ASRI data), the AI algorithm 1510 may build (e.g., within neural network model 1512) an understanding on how the data streams (sensor data and radio network information) look before certain events in the network. For instance, with camera as a sensor, the neural network 1512 may learn after a few occurrences that radio link failure follows when UE moves behind a blocking object. Therefore, based on the learned model, the AI algorithm 1510 may be able to trigger (e.g., cause) an action such as a handover of the UE/user device when the camera feed (sensor data feed) indicates that the UE is going to move behind the blocking object, e.g., based on its current path and speed, as indicated over multiple data samples or video frames, for example.

Thus, according to an illustrative example embodiment, the system may perform several operations: 1) Sensors capturing spatiotemporal data from the environment; 2) Radio-Network (RN) capturing RN Information (RI); 3) RI is associated with the sensor data feed (SDF) (Associated Sensor & Radio-Network Information ASRI); 4) The ASRI samples considered to be relevant for network performance are labeled and selected from the stream of ASRI data; 5) The relevant associated data samples are stored to a database or forwarded directly for further processing. 6) A training process is performed, e.g., where Artificial Intelligence (AI) based model learns correlating patterns among SDF & RI from historical data known to lead to events relevant for network performance (an example of correlating patterns among sensor data and RI may include: Forklift moves from position X to position y, this typically leads to decrease in SINR for RI for a UE); and, 7) RN optimization (or radio network performance improvement), where the AI based algorithm 1510 may provide input or control information to perform actions (e.g., preemptive actions or predictive actions, which may include radio network actions and/or non-radio network actions) to improve (e.g., optimize) radio network performance.

Thus, according to an example embodiment, the neural network model 1512 (FIG. 15) may learn correlating patterns between SDF and RI for events that are relevant to the performance of the radio network 412. This may include the AI algorithm 1510 training the neural network model (e.g., without necessarily performing any resulting actions). Different AI learning techniques may be used to train the neural network model 1512. In addition, after training (and/or during training) of the neural network model 1512, live ASRI data may be received by AI Algorithm 1510 and fed to neural network model 1512. Based on the live ASRI data, the trained neural network model 1512 may output an indication of one or more actions to be performed, e.g., to improve the performance of the radio network 412. These actions to be performed may include radio network actions and/or non-radio network actions. Thus, for example, some data (e.g., live data or a second set of ASRI data) may be used to both 1) perform further training, and/or 2) determine an action(s) to be performed to improve or optimize radio network performance. Also, according to an example embodiment, a control loop may be used to measure a resulting change in radio network performance that resulted from (or associated with) the applied action. For example, the ASRI data may be fed to the AI algorithm and neural network model 1512 to detect error(s) (such as a resulting subsequent radio network performance that does not improve, or does not improve as much as expected based on the applied action), and then the neural network model 1512 may be updated based on this resulting radio network performance feedback to reduce error. Thus, in this manner based on this feedback, actions that do not result in improved radio network performance will be less likely to be performed or output by the neural network model, and more successful actions that are associated with a larger improvement in radio network performance will be more likely to be indicated (or output) by the neural network model or performed.

AI methods, such as supervised, un-supervised or reinforcement learning methods may be used to train the neural network model based on ASRI data. The training can be performed with live data and/or with data from a database. The neural network model describes input-output relationship of information found from ASRI data. The model depends on the use case and implementation.

Some, but not limiting, examples may include: 1) Train a neural network model 1512 to approximate the state transition function where the inputs are n latest ASRI samples before time t and output are m ASRI samples after time t. Therefore, the trained neural network model 1512 may, at least partially, predict or forecast the upcoming samples when given the recent samples as input. This information may be used later to perform the actions. Furthermore, based on subsequent ASRI feedback, the neural network model may evaluate a goodness (or success) of the performed actions, e.g., by approximating input-output relationship (with neural network) between the n latest ASRI samples and consequences of an action evaluated by a reward function (e.g., in a simple case, a reward is +1 if radio network performance improved and −1 otherwise). 2) After the neural network model 1512 has been trained, then use neural network model to trigger the actions (predictive or preemptive actions), when certain ASRI data is received (e.g., certain ASRI data is received that may match a particular pattern known by the neural network model 1512). After the model is trained, there are several alternatives how to implement the algorithm that performs the optimization actions, for instance: Provide forecast information of network conditions for a pre-programmed optimization algorithm. This way the model could e.g. give a warning signal of certain error events before they take place.

In addition, the trained neural network model may be used as a starting point for reinforcement learning algorithm which executes the actions and learns over time the optimal actions that may be preferred in order to optimize or improve radio network performance under different conditions (as indicated by different ASRI data). For instance, the method may perform (or cause or trigger) actions after certain amount of training data is obtained from the live network after which the reinforcement learning may begin. In one illustrative example, the neural network model 1512 may predict a future radio network KPI (e.g., predict SINR for UE at next data sample). This information may be used to perform or cause another entity to perform an action to improve radio network performance (e.g., increase SINR, or reduce an amount of decrease in SINR in a future ASRI sample). The predicted SINR may be provided to another entity, which may then perform an action.

Below are some illustrative (and non-limiting) examples of actions that may be performed related to following functions to optimize network KPIs (e.g., coverage, capacity, energy and reliability): Base station sleep modes; link adaptation; MIMO rank adaptation; link management (multi-connectivity, add or remove links, such as adding a link to improve connection robustness); URLLC reliability & latency management; handover decisions (e.g., cause UE to perform a handover from BS1 to BS2 that is not blocked or interfered with); Beamforming/beam management (e.g., switch UE to a different beam to avoid an interfering object); Power control (e.g., cause UE to increase transmission power); Interference coordination (e.g., send a message to adjacent BS to control interference from that BS); Antenna tilt or location optimization; quality-of-service/quality-of-experience management (these include items already listed).

Figure 16:
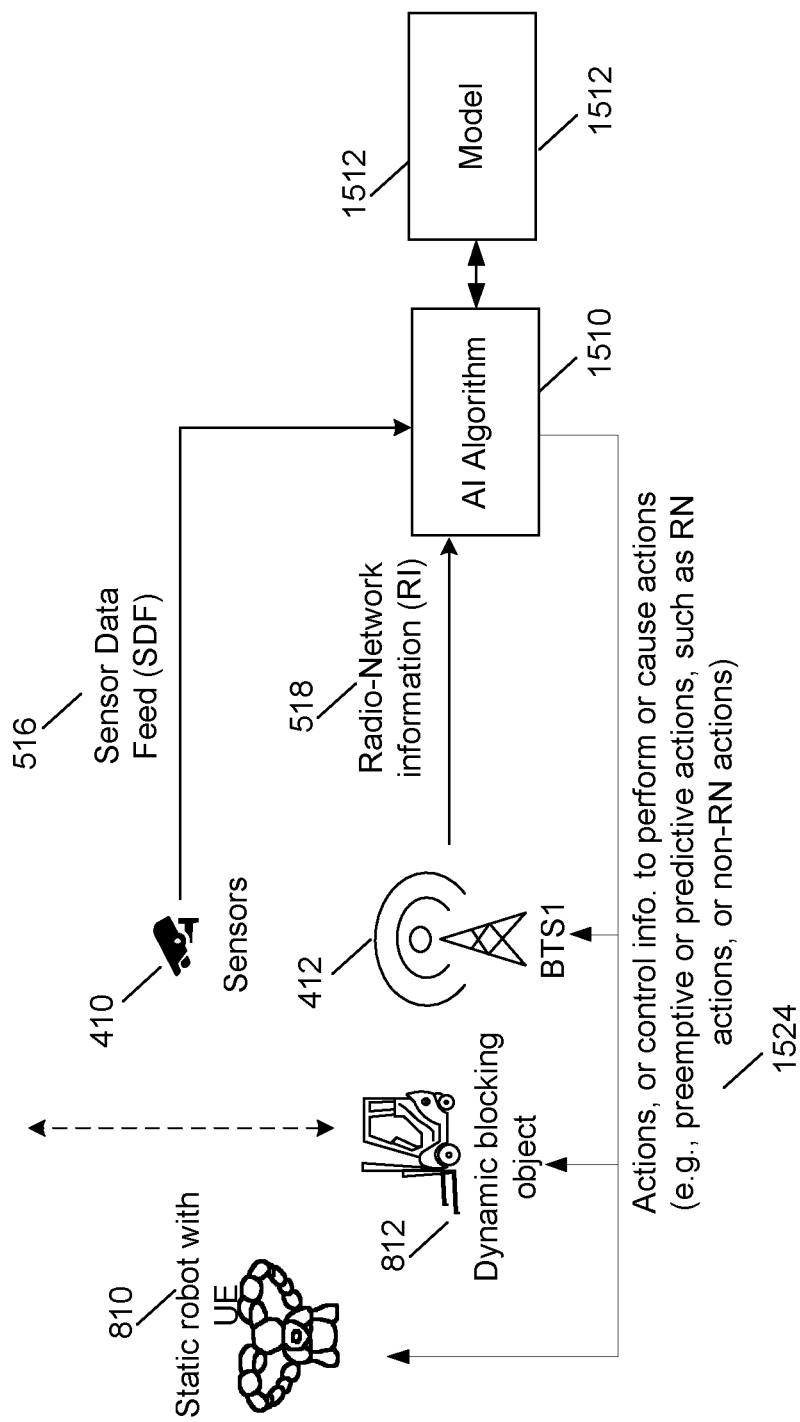
FIG. 16 is a diagram of a system according to another example embodiment.

FIG. 16 is a diagram of a system according to another example embodiment. In FIG. 16, the robot with a UE may be interfered with in some cases based on a moving blocking object (e.g., the moving forklift). In this example, the neural network model may learn (or may be trained based on) one or more correlating patterns of the ASRI data. For example, over a number of ASRI data sets, the neural network model 1512 may learn that when the object (e.g., forklift) 812 moves from position x to position y, this is associated with an immediate decrease in SINR (signal to interference plus noise ratio) of the UE of the robot 810. Thus, after the neural network model has been trained, reinforcement learning may be used to further refine the training of the neural network model. For example, live training ASRI data may be received by the trained neural network model, and different actions may be performed (or caused to be performed by another entity) in response to detecting this correlating pattern of the object moving from position x to position y. Over time, after performing a number of different actions, and measuring the resulting radio network performance (e.g., subsequent radio network SINR of the UE that resulted after performing the action), the neural network model 1512 may be further trained to further improve radio network performance Thus, for example, after trying hundreds or thousands of different actions when the object moves from position x to position y (which would usually result in a reduction in SINR of the UE on the robot 810), the best (or optimum) improvement in SINR of the UE in this situation may be to increase transmission power of the UE by z dB, and decrease the modulation and coding scheme (MCS) to a lower MCS, e.g., to allow communications between the UE and BTS1 to be more robust, and avoid a decrease in SINR. Or as another example embodiment, a preferred action may be to perform an immediate handover of the UE from BS1 (or BTS1) to BTS2 (not shown) that is not blocked by the blocking object, e.g., to avoid (or minimize) a decrease in the UE SINR (e.g., either the SINR measured by UE and reported to BS1, or SINR measured by BS1). In this manner, the neural network model 1512 may be trained to learn one or more correlating patterns of the ASRI data, and then subsequent data may be used by the neural network model 1512 to cause one or more actions to be performed to improve radio network performance.

Figure 17:
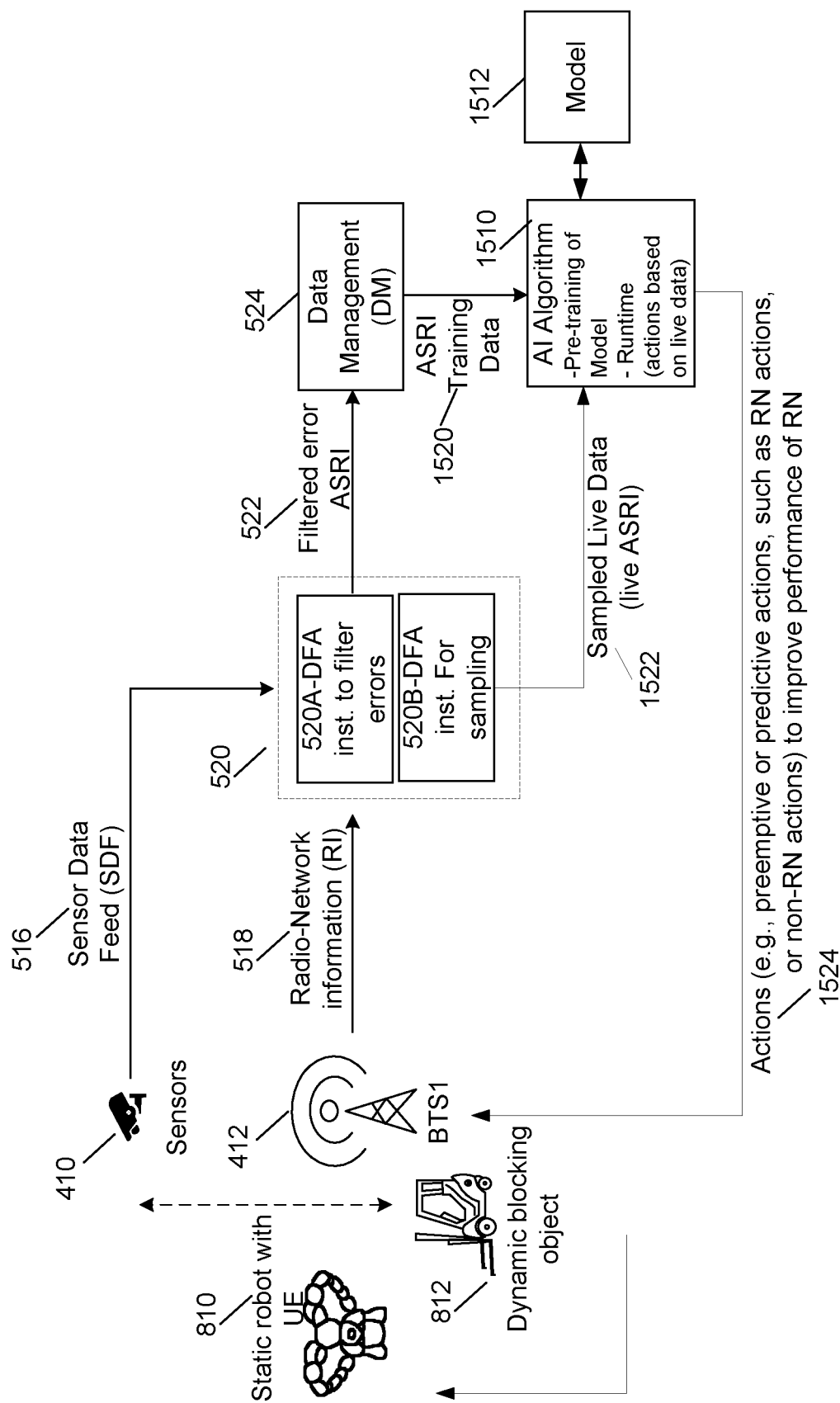
FIG. 17 is a block diagram illustrating a system in which separate DFA instances are used to filter training data and live data according to an example embodiment.

FIG. 17 is a block diagram illustrating a system in which separate DFA instances are used to filter training data and live data according to an example embodiment. As shown in FIG. 17 a DFA instance 520A is used to filter or identify errors (or ASRI data not pertinent to performance of the radio network, such as ASRI data associated in time with a decrease in SINR) for the training ASRI data 522, while a DFA instance 520B is used to sample ASRI data for the live ASRI data 1522 that may be used to cause or trigger actions. Thus, in this example, DFA instance 520A may filter to provide DM 524 only with ASRI data associated with one or more errors or decreases in radio network performance (such as the ASRI, including SDF/video frames associated in time with the decrease in SINR of the UE). This relevant ASRI data may be used to train the neural network model 1512, for example. After training, the DFA instance 520B may sample (but doesn't necessarily filter) ASRI data, to be provided as sampled live ASRI data 1522. Neural network model 1512 may then attempt to identify such correlating patterns in the ASRI data, to cause corrective actions to be performed, e.g., in attempt to improve the performance of the radio network.

Thus, according to an example embodiment, with reference to FIG. 17, radio network information (RI) may include SINR experienced by the robot UE (810) and SDF may include video image(s) from a camera attached to the BTS1 (which may indicate location of blocking object 812). Therefore, for example, the AI algorithm 1510 and neural network model 1512 may learn the correlation between the video images and SINR to predict the upcoming error that is caused by the blockage. To do this, training data is needed from the error situation to train the model. After the training is complete, the model needs continuous stream of live data to detect the upcoming errors. This is achieved by configuring two DFA instances explained below: For example, the neural network model 1512 may be looking for changes in position of the forklift, to flag or cause corrective actions to be performed, which may be a preemptive or predictive action since corrective action (at least in some cases) may be performed before the error (e.g., a decrease in SINR, or a significant decrease in SINR that would cause a disconnection of the UE from BTS1) actually occurs, based on the live ASRI data 1522 and the trained neural network model 1512 (which is now trained to recognize the correlation between the object 812 moving from location x to location y, and a decrease in UE SINR, for example). The system provides a technical advantage of allow an action, such as a preemptive corrective action, to be performed that may avoid an error or decrease in radio network performance, or to perform the corrective action before the predicted or expected error actually occurs. This is in contrast to a reactive action that may be performed after the error (e.g., drop in SINR of the UE) is actually detected, and the BTS1 may attempt a handover of the UE, but it may be too late to perform such a handover, and the connection between the BTS1 and the UE may be lost at that point when a reactive action is performed.

The first DFA-instance 520A may collects the training data: DFA instance 520A is configured to monitor the error event (e.g., decrease in SINR) caused by the blockage. When the RI indicates the error, the data association is triggered. The data before the event is fetched from the memory of DFA and sent forward with the data after the error event. Before sending the ASRI samples, the samples are labelled to indicate which event triggered the association, and the state of the error (before-during-after). The data association is ended according to a preconfigured rule being in this case some time interval after the error have ended. This data is forwarded for the DM that is visualized in FIG. 17 as bursts of data from the three detected errors.

The second DFA-instance is configured to stream live ASRI data for the AI algorithm 1510 and neural network model 1512. To save transmission bandwidth and processing power, the data association is configured to be done one time after every pre-defined sampling interval. This data is then forwarded directly for the AI algorithm 1510 and neural network model 1512 to be consumed. Based on the live data, the AI algorithm and/or neural network model identifies and performs preemptive corrective actions (e.g. (before the error occurs or before the error becomes too severe) to solve the upcoming error. For example, preemptive corrective actions may include, e.g., increasing transmission power, adjusting the MCS, performing a handover, or any other radio network change or adjustment, or a non-radio network action.

Thus, for example, the neural network model 1512 may be trained with the ASRI data from the 1st DFA instance 520A and the preemptive corrective actions are performed based on the sampled live ASRI data from the 2nd DFA instance 520B. FIG. 9 demonstrates why the described way of collecting the training data helps to build a predictive AI model. FIG. 9 shows three blockage-error events where the SINR drops below the threshold. FIG. 9 indicates the areas before-during-after the error. FIG. 10 shows the video frames during the first error showing that: before the error the dynamic object is approaching (1010); during the error the dynamic object is front of the UE (1012); and after the error the object is moving further away (1014).

Figure 18:
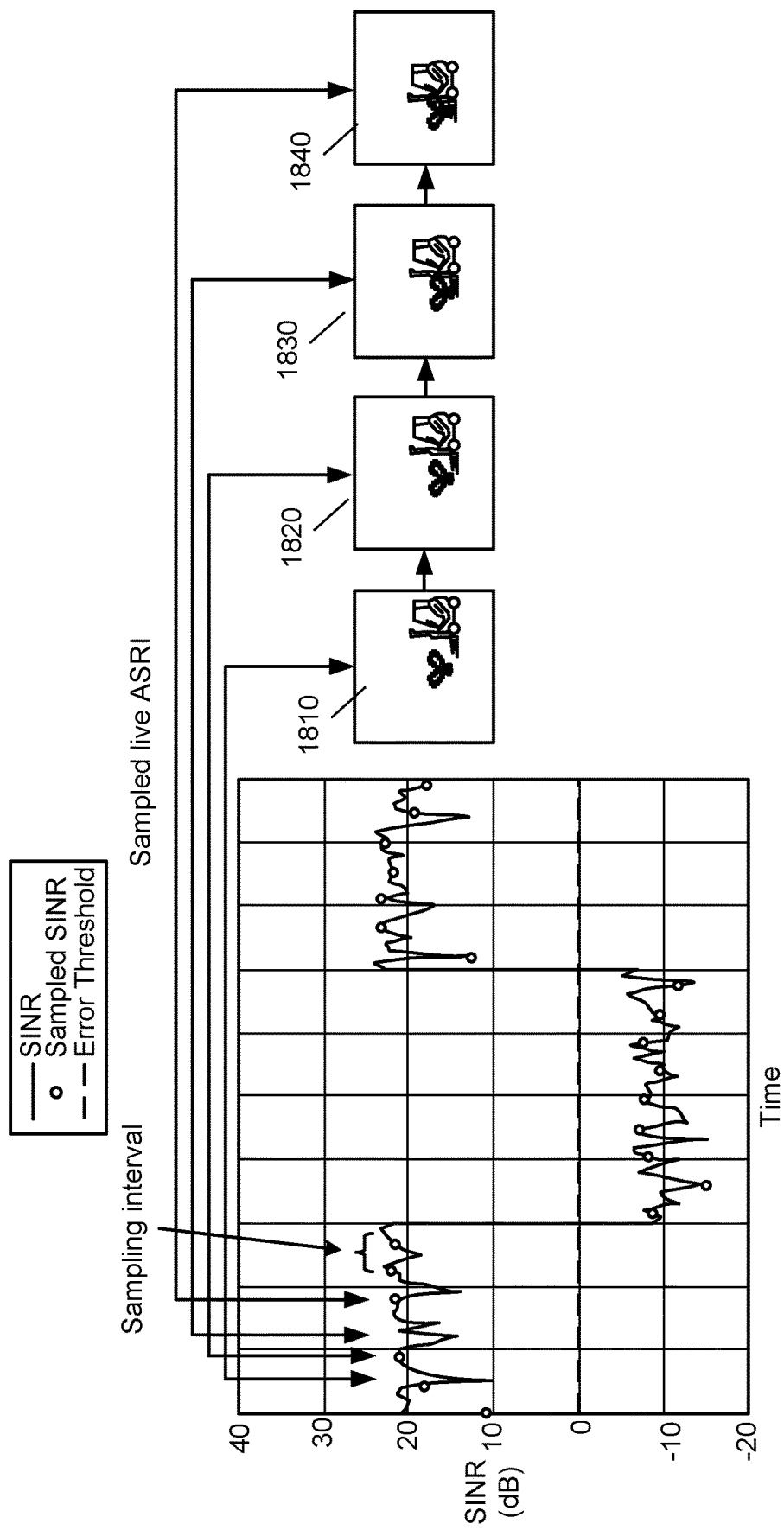
FIG. 18 illustrates SNR data samples from live data that is input to the neural network model according to an example embodiment.

All the error events caused by the blockage show similar behaviour with the SINR and video frames. This is demonstrated with FIG. 11 showing the typical video frames before-during-after the error and the SINR curves of three different errors events aligned based on the video images. FIG. 11 demonstrates that storing this type of data stores information of the root cause of the error caused by the blockage. Therefore, when training the AI model with this data the model may be able to identify the ASRI samples that are leading to errors. This is demonstrated in FIG. 18 with sampled live ASRI data, from the 2nd DFA instance 520B, that is fed or input to the AI algorithm 1510 and neural network model 1512. FIG. 18 illustrates SINR data samples from live data that is input to the neural network model 1512 according to an example embodiment. The four ASRI samples (1810, 1820, 1830, 1840, e.g., indicating change in position of object over four video frames) shown in FIG. 18 indicate (in this example, based on known correlating patterns known by model 1512) that the dynamic object is going to block the radio signal and cause a significant decrease in SINR (for example). If the neural network model 1512 is properly trained, and when giving the neural network model 1512 these live ASRI samples, the neural network model 1512 can predict the error (e.g., signal blockage or significant decrease in SINR for the UE), and thus preemptive corrective actions can be performed to solve or address the issue (e.g., preemptive corrective action(s) may be performed to avoid the error and/or to at least decrease severity of the error).

Figure 19:
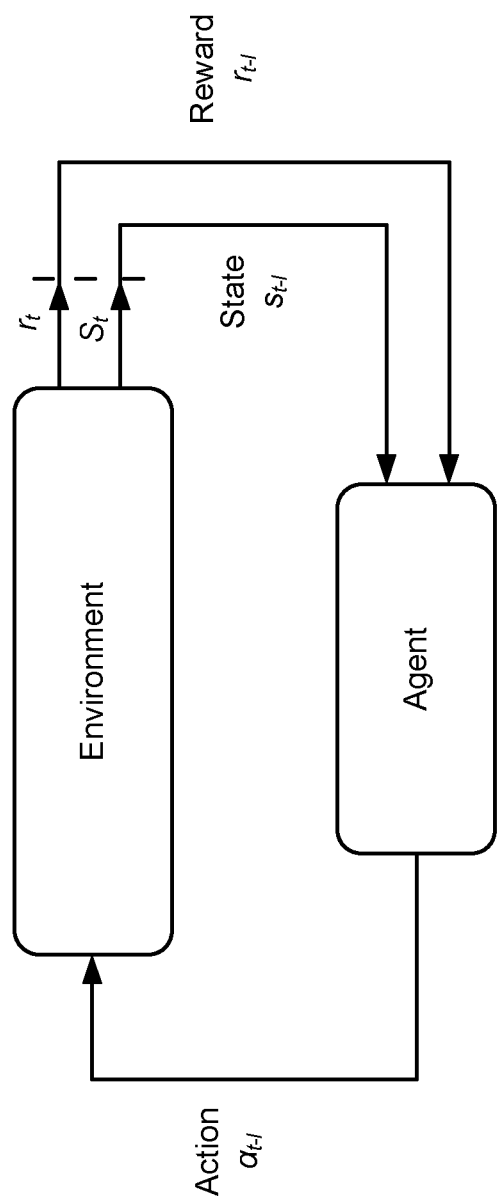
FIG. 19 is a diagram illustrating operation of reinforcement learning according to an example embodiment.

FIG. 19 is a diagram illustrating operation of reinforcement learning according to an example embodiment. Reinforcement learning is a subfield of machine learning, where the machine learning algorithm learns to perform a given task by trial and error. Referring to FIG. 19, the agent (e.g., software agent) refers to or may include the entity (e.g., AI algorithm 1510 and/or neural network 1512) that may be trained, and then adjusted or adapted based on various actions that are performed. The environment may refer to various parameters or objects that may be measured (e.g., ASRI data), and/or controlled via applied actions. The basic principle of reinforcement learning is illustrated in FIG. 19, where the environment is in state-s and receives a reward-r after taking some action-a. When taking a new action, the environment is in a new state and receives a new reward. The reinforcement algorithm tries to learn which action to take in which states to maximize the future reward. In the radio network context, the reinforcement learning may work as follows: State of the environment could be described as locations of the objects parameters of the radio network, and/or sensor data such as video camera images (ASRI data); Actions may include radio network actions and/or non-radio network actions, such as adjusting MCS or transmission power, performing a handover, moving the base station antennas, or other action. The Reward may be detected as or based on an improved UE SINR compared to previous state, or improved UE reliability.

Figure 20:
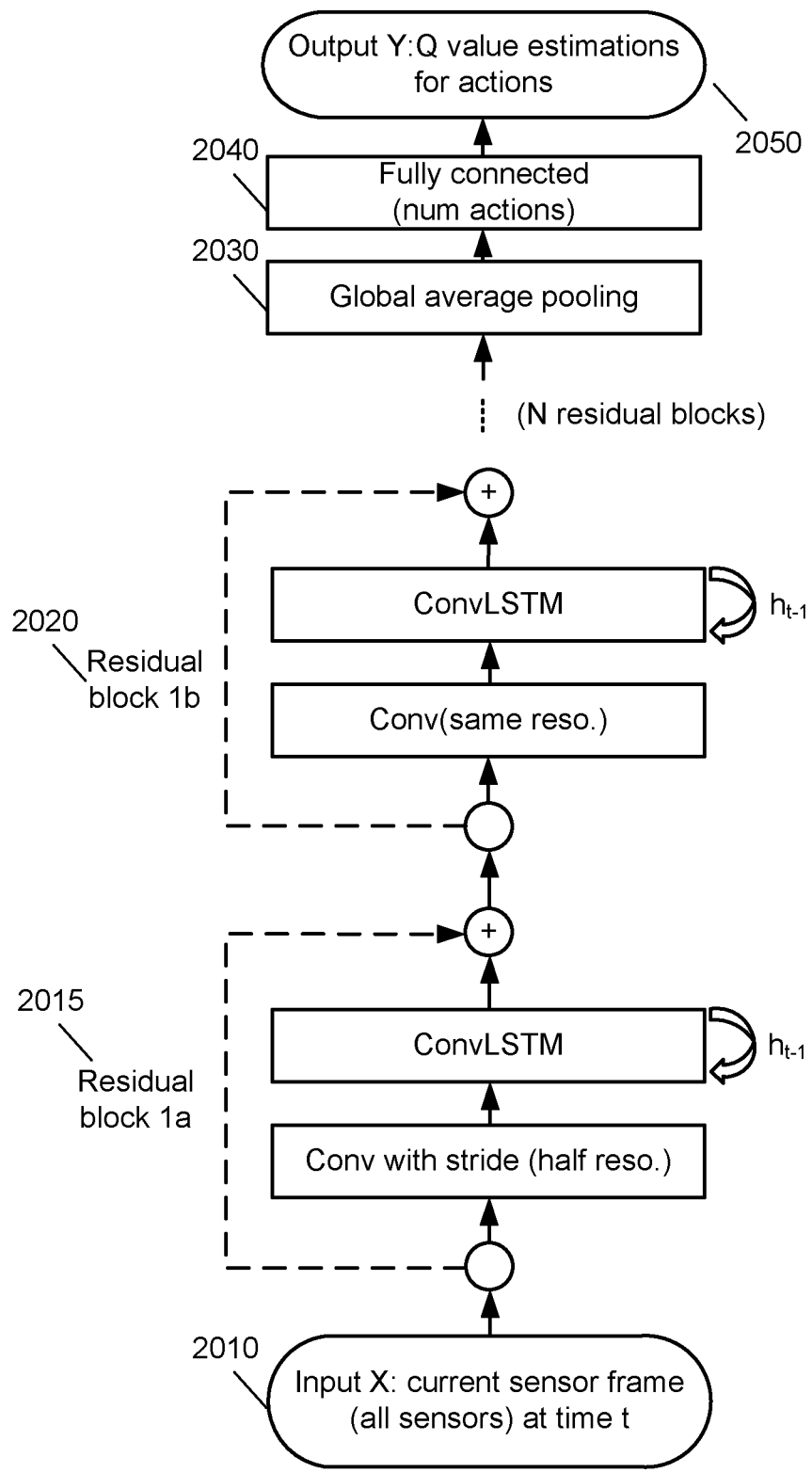
FIG. 20 is a block diagram illustrating a neural network architecture (neural network model) according to an example embodiment.

FIG. 20 is a block diagram illustrating a neural network architecture (neural network model) according to an example embodiment. The Neural network architecture of FIG. 20 provides a function between multiple inputs (X), and multiple outputs (Y); Arrows indicate the flow of data from the bottom to the top in FIG. 20. At 2010, inputs (X) are received at time t from sensors. At 2015, (residual block 1a), a well known neural network method is performed, including Convolution long short term memory (ConvLSTM) that uses prior knowledge and convolution, based on inputs (e.g., video data frames) and considers previous video frames (e.g., to see forklift moving). Also, the number of parameters can be reduced by using convolution. At 2020, residual block 1b (there may be multiple residual blocks) provides further (or deep) learning, e.g., evaluating the data at lower and lower resolutions. At 2030 (global average pooling) and 2040 (num actions), the neural network will correct or adjust the number of nodes or vectors to the correct size, to provide a probability value for each action, For example, if there are 100 actions, then the neural network may provide 100 outputs. At 2050, the neural network outputs Q values, based on a reinforcement learning referred to as Q learning, which is a function that takes in sensor values (input X), and output is probability distribution of actions, e.g., what is a best action based on these inputs. Note that other reinforcement learning methods can utilize deep learning in a slightly different way. For instance, similar network architecture could be used in A3C algorithm where the output Y would consist of policy P(X) and value estimate V(X), where X is the state or input.

During machine learning or training, there may be multiple pairs of X inputs, which produces Y output (probability of output); apply input (change in location of the object/forklift), and for different inputs, there are a set of outputs (Y) that are generated (probability of an action). Q learning is an algorithm that may select a best action, or largest output value, and then apply that corresponding action on Radio network, and measures if that rewards was achieved, and updates probability or Q values of that action. There may be a set of actions that resulted in a certain results, measured against rewards. It may not be clear which action caused the change that had a positive reward. In A3C algorithm the network would already select the policy (probability of each action) and value estimation for each of the actions.

Figure 21:
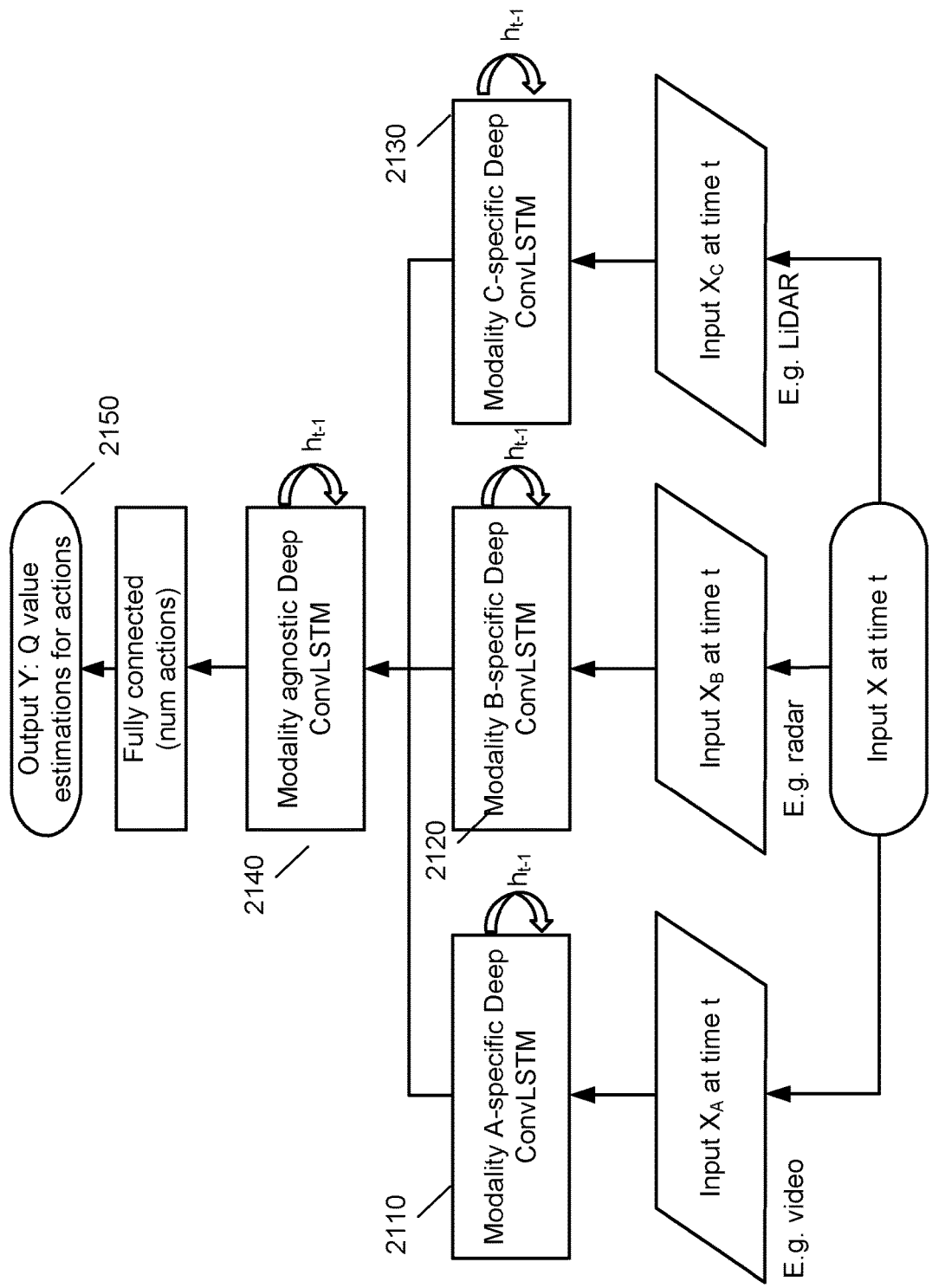
FIG. 21 is a block diagram illustrating a neural network architecture (neural network model) that uses multiple input modalities according to an example embodiment.

FIG. 21 is a block diagram illustrating a neural network architecture (neural network model) that uses multiple input modalities according to an example embodiment. Different modes or modalities of input data may be input or provided, e.g., such as video frames, radar data, and LiDAR data. As shown in FIG. 21, each of these types of data may be separately processed, and then a deep learning is performed based on all of the input modalities. For example, a modality specific-Convolution long short term memory (ConvLSTM) is performed for video (2110), radar (2120) and LiDAR (2130). At 2140, deep learning is then performed, where modality specific-Convolution long short term memory (ConvLSTM) is performed for all three data types or input modalities. At 2150, the neural network outputs Q values estimation for each action for multi-model inputs. Again, for A3C algorithm, the network would output V(X) and P(X) instead of Q(X). Thus, for multiple input modalities the beginning of the network may be split so that there are some layers that are modality dependent (for different modalities or input types, such as video, radar, LiDAR, in this example), and those layers are then connected or combined to modality agnostic part of the network as depicted in FIG. 21. By employing a neural network model that includes multiple input modalities, this can improve the results and also enables better pretraining of the neural network, since data of different types or modalities may be used for training.

Figure 22:
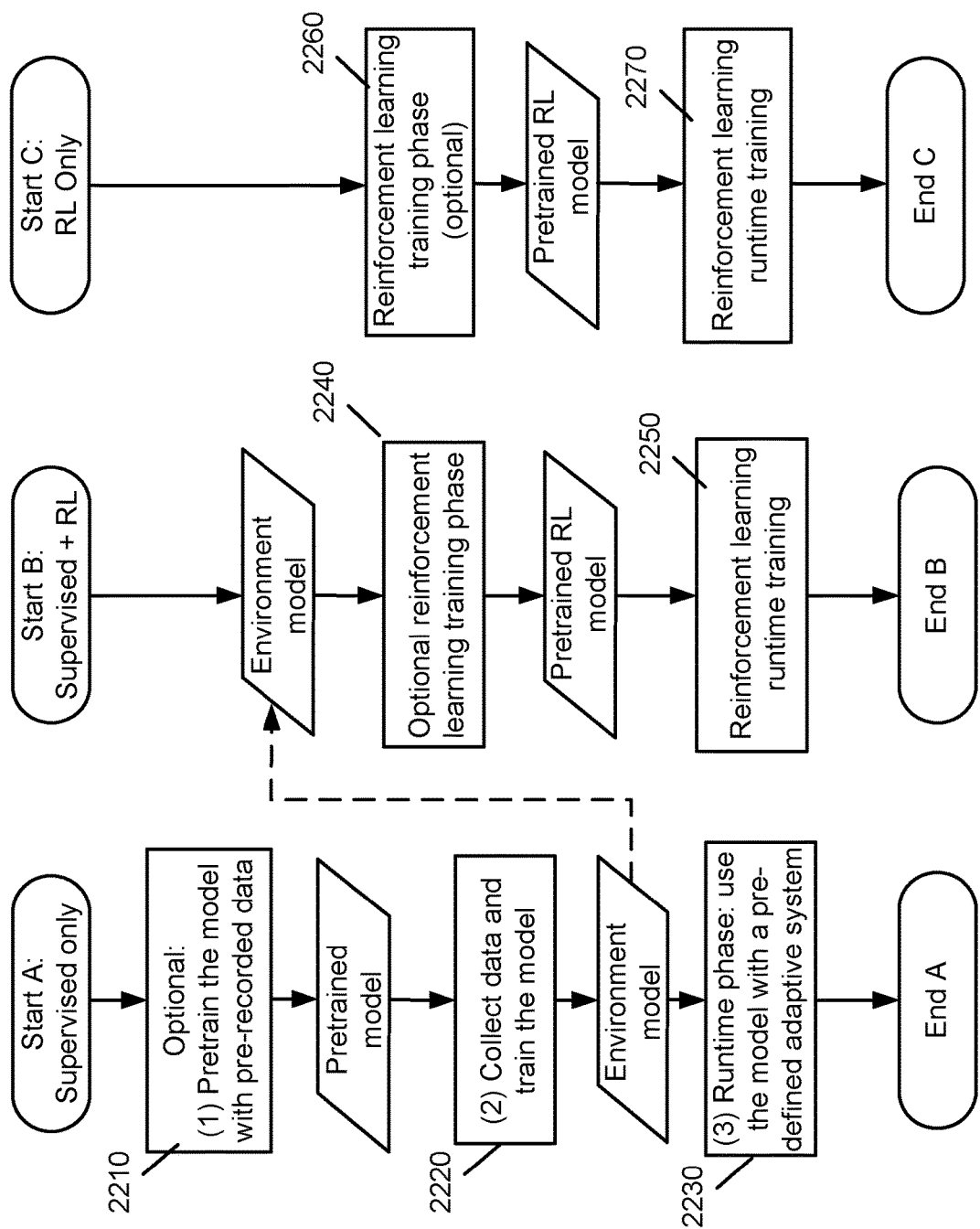
FIG. 22 is a block diagram that illustrates an overview of different learning that may be used and/or combined to train a neural network model according to an example embodiment.

FIG. 22 is a block diagram that illustrates an overview of different learning that may be used and/or combined to train a neural network model according to an example embodiment. As shown in FIG. 22, three options are shown for learning, including: option A) supervised training; option B) supervised plus reinforcement learning; and Option C) reinforcement learning only.

For option A) (supervised only), at 2210, the model (neural network model) may be pretrained with prerecorded data, to obtain a pretrained model. At 2220, the input data (e.g., ASRI data) may be collected and the model may be trained to obtain an environment model, and at 2230, the runtime phase may be performed in which the model is used based on live data to determine and/or perform actions.

If Option B) is performed (supervised plus reinforcement learning), after supervised learning is performed to produce the environment model, at 2240 reinforcement learning (RL) training phase may (optional) be performed, e.g., to obtain a pretrained RL model. At 2250, RL runtime training is performed with live data.

If option C) is performed (reinforcement learning (RL) only), at 2260, reinforcement learning training phase may be performed (optional), e.g., to obtain a pretrained RL model. At 2270, reinforcement learning (RL) runtime training with live data is performed.

Option A) Supervised only method is trained with real data and actions recorded from the environment. The training objective can be, e.g., to try to learn the state of the system in the future, given previous frames and actions. According to an example embodiment, there can be other surrogate tasks performed, other than future prediction. For instance, the neural network model can predict radio network KPIs (e.g., a SINR for a next or subsequent data sample), etc. The output of the supervised method is the Environment model. It can be used as an input to a predefined adaptive system. For instance, the model could indicate the upcoming errors for a pre-programmed optimization algorithm. Simplest way is to use supervised only, as it does not have reinforcement learning. Output is environment model—in a simple example related to the forklift example, the environment model (a neural network) may indicate, probabilities for one or more (or all) KPIs: As an example, SINR: Predicts SINR of a UE for next time stamp/sample; would indicate a most probable SINR value for next sample/time stamp, for each BS.

Option B) Supervised+Reinforcement Learning: Environmental model created by observing the environment. The neural network model may be attempting to create a policy (or model) of what actions should be performed for different inputs, based on reward system. In option A), SINR reduces when Forklift moves, but there are no actions applied yet. In option B), different actions are applied (e.g., for Q learning—each output indicates expected reward if the action is taken); so apply different actions, and observe output, and then adjust Q values, depending on reward achieved based on applied action)

Option C) In this option, the reinforcement learning model is trained directly without any pretraining. It may contain a RL training phase, where the method is allowed to explore the different output options in a realistic situation, but where mistakes can be overcome.

Figure 23:
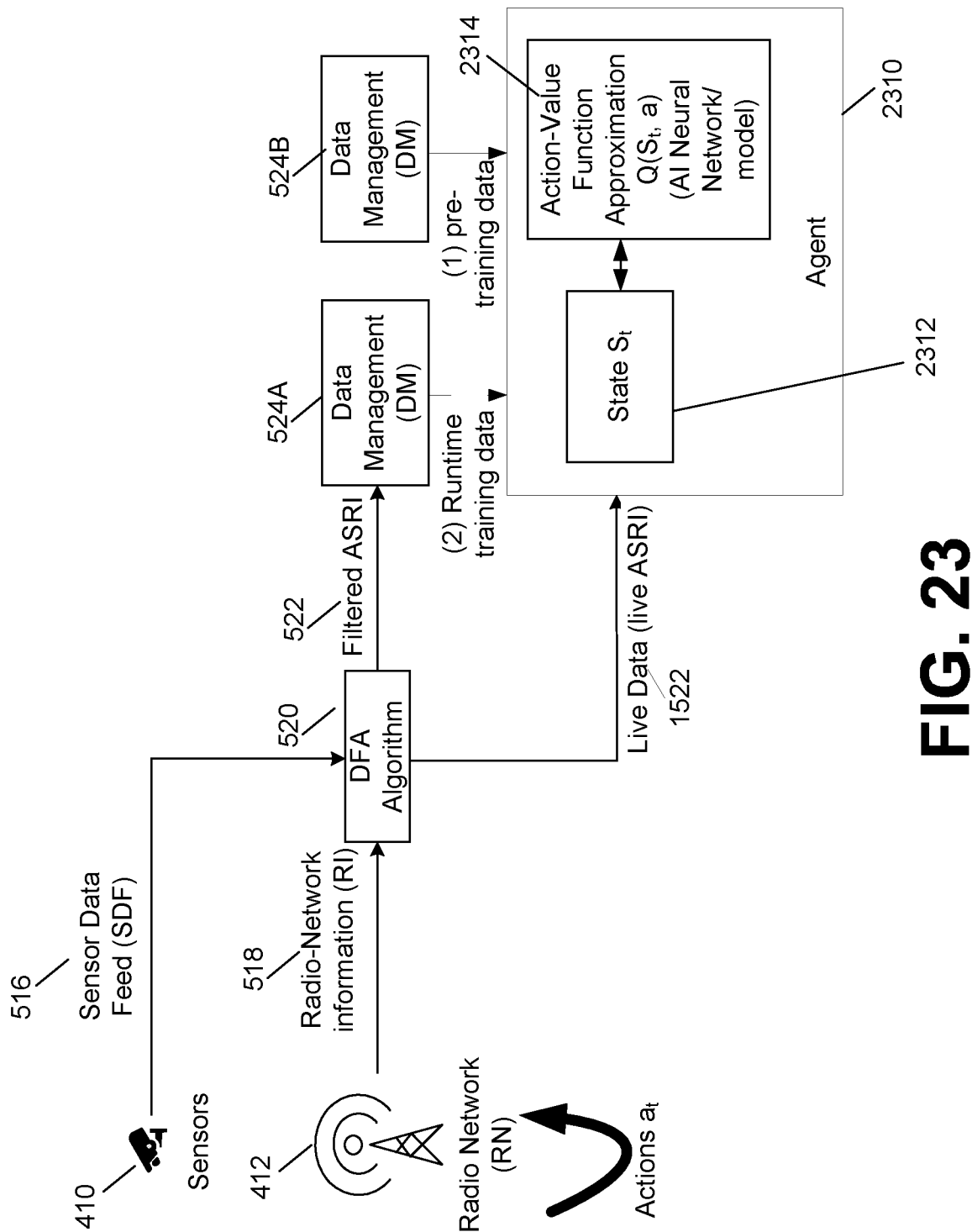
FIG. 23 is a block diagram illustrating a training phase for a neural network model based on options A and B according to an example embodiment.

FIG. 23 is a block diagram illustrating a training phase for a neural network model based on options A and B according to an example embodiment. During a learning phase, pretraining data (for supervised learning) from DM 524B is input to agent (e.g., AI algorithm and/or neural network model) 2314, and runtime training data (for reinforcement learning) may be input to agent 2314 from DM 524A.

In another embodiment training or pretraining may be based on modality specific parts (see e.g., FIG. 21) of the environment model by cross-referencing different input modalities. For example, the radar part of the model can be trained by having it predict the content and changes in the video camera content content $X_{video}=f_{video}(X_{radar})$ and vice versa $X_{radar}=f_{radar}(X_{video})$, where f represents the modality-specific part of the network. This allows to pretrain those modality specific parts of the network with existing data in a data-efficient manner. This cross-referencing training can be also continued even during the final training.

Figure 24:
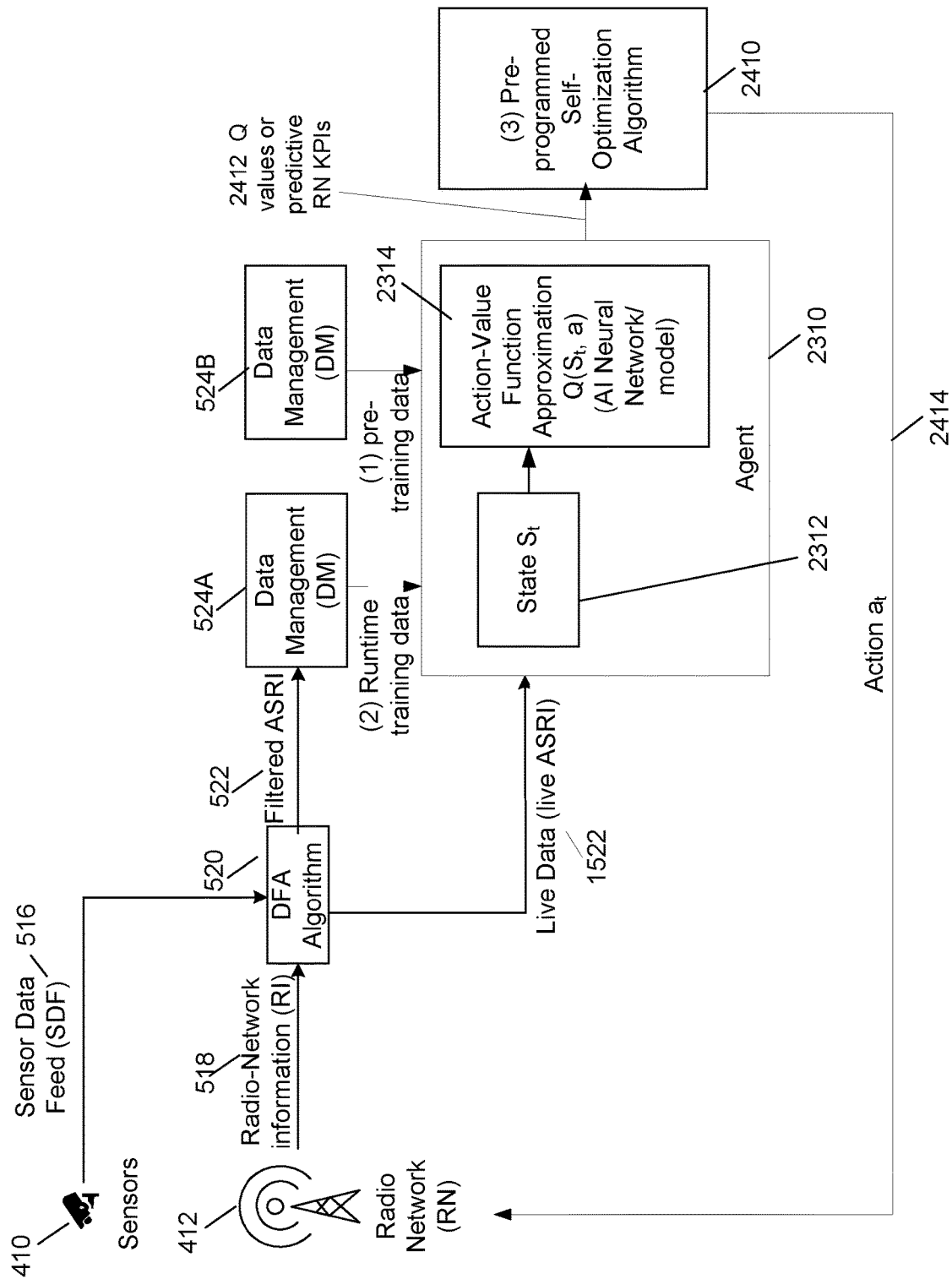
FIG. 24 is a block diagram illustrating a runtime phase for a neural network model according to an example embodiment.

FIG. 24 is a block diagram illustrating a runtime phase for a neural network model based on option A according to an example embodiment. As shown in FIG. 24, during runtime phase, live data (live ASRI data) may be received and input to the agent 2310. Based on the trained neural network model and the live ASRI data, action-value function approximation 2314 of agent 2310 generate output (e.g., probability values, predictive KPIs for radio network, such as SINR for next time sample or Q-values) based on $S_t$ (state 2312, or live ASRI data) and a (actions performed). The output of the agent 2310 may be input to a pre-programmed self-optimization algorithm 2410. Based on the agent output, the self-optimization algorithm 2410 may determine one or more actions (e.g., preemptive corrective actions, such as radio network actions or non-radio network actions) to be performed to improve the performance of the radio network 412. At 2414, the self-optimization algorithm 2410 may indicate (or send control information indicating) a preemptive corrective action to be performed.

Thus, referring to FIG. 24, live data is fed to the model and the output is forwarded for a pre-defined adaptive system, e.g., provide indication of an upcoming handover failure for a pre-programmed handover optimization algorithm 2410. Action-Value approximation Q 2314 may be a neural network model that estimates which action(s) should be taken based on state $S_t$, which is based on current ASRI data (or subset of the ASRI data). In live mode—output from 2310 or 2314 may include Q values for each of multiple actions. Thus, for example, the outputs may be either 1) a predicted KPI for next time sample (e.g., expected SINR for next time sample); or 2) Q values—may be or may include an estimate of expected future reward for each of multiple actions (e.g., an action associated with highest reward or highest Q value may be performed).

Figure 25:
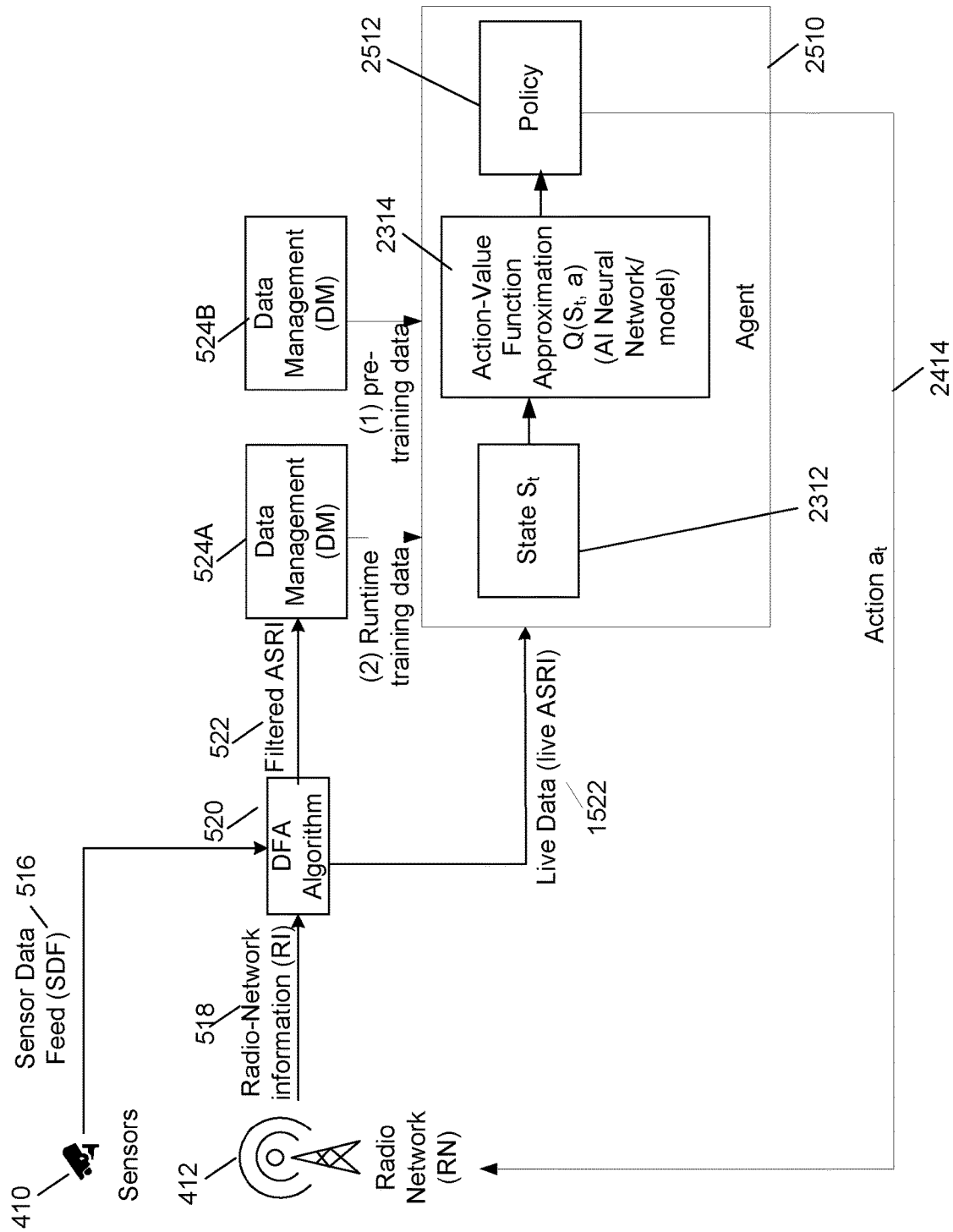
FIG. 25 is a block diagram illustrating a runtime phase for a neural network model in which a policy for determining an action is included within an agent according to an example embodiment.

FIG. 25 is a block diagram illustrating a runtime phase for a neural network model based on option B in which a policy for determining an action is included within an agent 2510. In FIG. 25, the agent 2510 (including the action-value function approximation neural network 2314) learns the optimal policy 2512 for selecting the actions. This will require trial and error to converge towards optimal solution. Thus, in FIG. 25, the policy 2512 is generated or created by the agent itself—agent 2510 selects the action. Whereas, in the system of FIG. 24, the neural network (action-value function approximation 2314) provides prediction of environment state—e.g., the KPI prediction for multiple KPIs (which might be expected KPI values for next time sample).

With option C, the main difference to options A & B (FIGS. 23-24) is that this approach doesn't have any preprogrammed capabilities to control the network. The algorithm starts without any prior information on how to control the network. The goal is to learn the optimal policy to control the network via reinforcement learning. Therefore, this approach could be most suitable for situations where errors are tolerated, such as deployment optimization phase of the network before setting the network live. This is also suitable for cases with novel sensors or novel environments that cannot be easily pretrained.

Thus, according to an example embodiment, various example embodiments may provide a predictive model, to take actions, based on the ASRI data and the model, to improve performance or radio network. The system (based on the trained neural network model and live ASRI data) may provide or indicate preemptive corrective actions that can be performed to avoid negative RN events or improve RN performance (the action may improve RN performance, as compared to if action had not been performed).

Some example Advantages may include one or more of:

The association of RI and sensor data captures additional information on events in the environment that impacts the network performance. This allows to perform predictive self-optimization (or preemptive corrective actions) that would have not been otherwise possible because in many cases traditional radio network information used for network optimization doesn't indicate the upcoming events early enough and therefore the traditional algorithms are reactive rather than preemptive (or predictive).

An AI neural network model may be trained based on associated sensor data (e.g., based on data associated with physical environment) and radio network information (ASRI). In this manner, the AI neural network model may learn correlating patterns among the ASRI data. As an example correlating pattern, the AI neural network model, based on training ASRI data, may learn that a forklift moving from position x to y is associated with (or is correlated with) a significant decrease in UE SINR within z ms (e.g., within 2 ms). Furthermore, as part of training or reinforcement learning, one or more actions may be performed, and resulting ASRI may be received by the neural network model, and the AI neural network model (e.g., weights of the neural network model) may be adjusted or adapted based on which actions improve radio network performance (e.g., which actions cause a highest resulting UE SINR for the next data sample or next n data samples), and which actions do not improve radio network performance, for various ASRI data. Then, live ASRI data may be input to the trained AI neural network model to trigger one or more preemptive corrective actions (e.g., radio network actions and/or non-radio network actions) in order to improve performance of the radio network, e.g., such as one or more actions that have been shown to result in a highest UE SINR for the next data sample or next n data samples. Thus, through the use of an AI neural network model that may learn correlating patterns for ASRI data, preemptive corrections actions may be performed to improve radio network performance, rather than performing a reactive action that may typically be performed only after a significant degradation in radio network performance has been detected.

For instance, an associated video stream may reveal that the reason for sudden radio link degradation is an object blocking the radio signal, or an associated press of a button may reveal that opening a door introduces significant interference within certain area of the building from outdoor base stations.

Providing associated RI and SDF may be used to make decisions on one or more actions that may be performed to improve RN performance (or actions that may be used to prevent an error), or actions that may be triggered to improve RN performance. These actions that may be triggered may include a RN action (e.g., increasing transmission power, performing a handover of the UE, switching the UE to a more robust MCS, . . . ), or actions associated with the physical environment, e.g., such as changing the movement or timing of movement of a blocking object, changing a positioning or orientation of a blocking object, or other change in status of the physical environment. For example, with respect to FIG. 2, based on previously received ASRI data, it has been observed that when blocking object 218 reaches coordinate of 150 m, and moving left to right, this correlates with an error condition that will last until the blocking object reaches a position of about 350 m. Thus, based on a subsequent ASRI, the system may perform a RN action, such as performing a handover of the UE from BTS1 to BTS2 when blocking object reaches 140 m, or increases transmission power when blocking object reaches 150 m. The neural network model may learn these correlating events, and then may be used, when presented with similar live data, to trigger or cause preemptive corrective actions to be performed to address or reduce the problem.

The association of RI and sensor data captures additional information on events in the environment that impacts the network performance. In addition, by labelling and storing the data, before and after the events, the information leading to these events are stored which can be used e.g., to train models that are able to predict these events based on live data feed.

For instance, an associated video stream may reveal that the reason for sudden radio link degradation is an object blocking the radio signal (as illustrated in FIG. 2), or an associated press of a button may reveal that opening a door introduces significant interference within certain area of the building from outdoor base stations (as illustrated in FIG. 3).

In an example embodiment, indoor to outdoor isolations may have significant impact on reliability level. For example, in some cases, opening a factory door may be equivalent to isolation reduction of 10 to 20 decibels.

However, it is important to note that the example embodiments and techniques are not restricted to the given examples. The examples and techniques may be applicable to any use case where spatiotemporal changes have impact on radio network performance e.g.: Logistics automation: sensors may track movement of containers, in logistic center or harbor, that have significant impact for the wireless connectivity; Connected hospitals: opening a door in MRI or surgery room may introduce interference (these types of rooms are typically isolated from radio waves); Elevators with wireless connectivity: sensor may track state of the elevators in an elevator shaft which is relevant for the quality of connectivity; Connected-Cars/Trains or eMBB users within cars/trains: sensor data may indicate e.g. that the car/train is approaching 5G network coverage outage area.

Some example embodiments are now described.

Example 1

Figure 26:
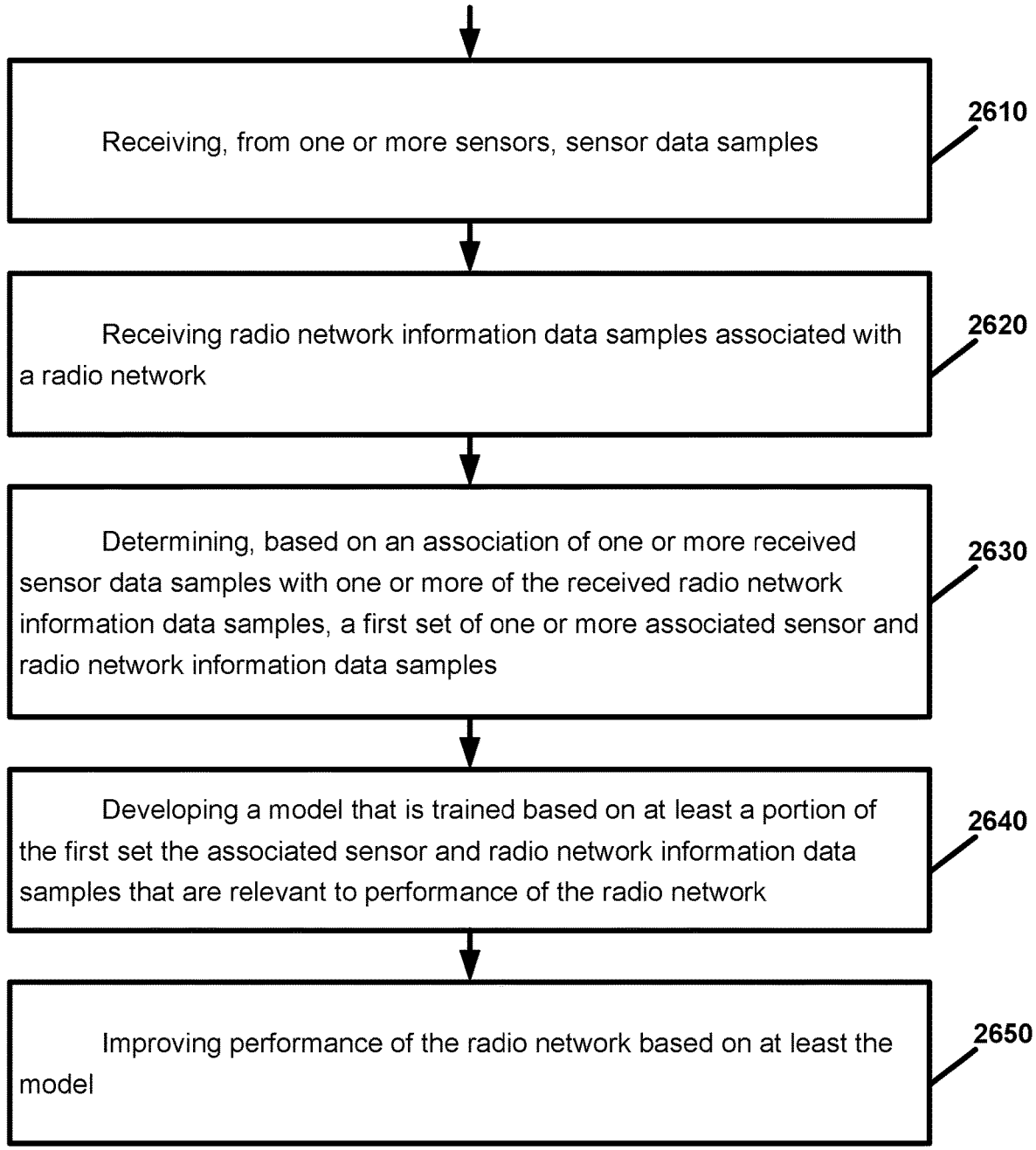
FIG. 26 is a flow chart illustrating operation of a system according to an example embodiment.

FIG. 26 is a flow chart illustrating operation of a system according to an example embodiment. Operation 2610 includes receiving, from one or more sensors, sensor data samples. Operation 2620 includes receiving radio network information data samples associated with a radio network. Operation 2630 includes determining, based on an association of one or more received sensor data samples with one or more of the received radio network information data samples, a first set of one or more associated sensor and radio network information data samples. Operation 2640 includes developing a model that is trained based on at least a portion of the first set the associated sensor and radio network information data samples that are relevant to performance of the radio network. And, operation 2650 includes improving performance of the radio network based on at least the model.

Example 2

According to an example embodiment of the method of example 1, the improving performance of the radio network comprises: determining a second set of one or more associated sensor and radio network information data samples; and, performing or causing another entity to perform one or more radio network actions and/or one or more non-radio network actions to improve the performance of the radio network, based on the model and the second set of one or more associated sensor and radio network information data samples.

Example 3

According to an example embodiment of the method of example 2, the performing or causing another entity to perform comprises performing or causing another entity to perform one or more preemptive actions including one or more radio network actions and/or one or more preemptive non-radio network actions based on the model and the second set of one or more associated sensor and radio network information data samples, wherein a preemptive action comprises an action that is estimated to at least reduce a decrease in performance of the radio network based on the model and the second set of one or more associated sensor and radio network information data samples.

Example 4

According to an example embodiment of the method of any of examples 2-3, wherein: the first set of one or more associated sensor and radio network information data samples comprises training data that is used to train the model; and the second set of one or more associated sensor and radio network information data samples comprises live data that is used, with the trained model, to perform or cause another entity to perform one or more radio network actions and/or one or more non-radio network actions to improve the performance of the radio network.

Example 5

According to an example embodiment of the method of any of examples 2-4, the performing or causing another entity to perform one or more radio network actions and/or one or more non-radio network actions comprises performing at least one of the following based on the model and the second set of one or more associated sensor and radio network information data samples: performing or causing another entity to perform one or more radio network actions; providing one or more input parameters to a network optimization entity or another entity; and, performing or causing another entity to perform one or more non-radio network actions where an object or an aspect of a physical environment is changed.

Example 6

According to an example embodiment of the method of example 5 wherein the performing or causing another entity to perform one or more non-radio network actions where an object or an aspect of a physical environment is changed comprises: performing or causing another entity to perform a change in a position, location, orientation, speed and/or movement of an object that impacts performance of the radio network.

Example 7

According to an example embodiment of the method of any of examples 1-6, the improving the performance of the radio network comprises performing a radio network action, comprising performing a radio network action related to at least one of the following: a handover of a user device to a target base station; a load balancing of traffic or data between two or more base stations; a link adaptation for a radio link between a base station and a user device; a cell selection or cell reselection performed by a user device; a scheduling; a resource allocation; a transmit power control; and a timing advance adjustment.

Example 8

According to an example embodiment of the method of any of examples 1-7, the model comprises at least one neural network.

Example 9

According to an example embodiment of the method of any of examples 1-8, wherein the developing a model that is trained comprises training the model based on at least one of: training the model using supervised learning; training the model using reinforcement learning; training the model using unsupervised learning; and training the model by cross-referencing different input modalities.

Example 10

According to an example embodiment of the method of any of examples 2-9, further comprising: determining a resulting change in a performance of the radio network in response to the one or more radio network actions and/or one or more non-radio network actions; and, determining a reward associated with the performed one or more radio network actions and/or performed one or more non-radio network actions, wherein the reward is based on whether the performed one or more radio network actions and/or performed one or more non-radio network actions results in or is associated with an increase or decrease in performance of the radio network.

Example 11

According to an example embodiment of the method of any of examples 2-10, wherein the developing a model comprises: training the model based on the first set of one or more associated sensor and radio network information data samples; and, performing further training of the model based on the second set of one or more associated sensor and radio network information data samples and the performed one or more radio network actions and/or one or more non-radio network actions.

Example 12

According to an example embodiment of the method of any of examples 2-11, wherein the developing a model that is trained comprises training the model based on: determining a resulting change in a performance of the radio network in response to the performed one or more radio network actions and/or performed one or more non-radio network actions; and training the model based on the second set of one or more associated sensor and radio network information data samples, the performed one or more radio network actions and/or the performed one or more non-radio network actions, and the determined resulting change in the performance of the radio network.

Example 13

According to an example embodiment of the method of any of examples 1-12 wherein the improving performance of the radio network comprises outputting at least one of the following: a key performance indicator of the radio network for a next data sample; and an estimated best action and/or probability distribution over available actions or an estimated reward for each of one or more actions, using one or more of Q-Learning, policy gradient, or actor-critic algorithms.

Example 14

According to an example embodiment of the method of any of examples 1-13 wherein the model estimates a state transition function between inputs that include a plurality of associated sensor and radio network information data samples before time t and outputs that include one or more predicted sensor data samples and/or one or more predicted radio network information data samples after time t.

Example 15

According to an example embodiment of the method of any of examples 2-14 and further comprising: determining a predicted future state of the radio network based on the second set of one or more associated sensor and radio network information data samples and the model; and improving performance of the radio network based on at least the predicted future state of the radio network.

Example 16

According to an example embodiment of the method of any of examples 2-15 and further comprising: determining a predicted future state of the radio network based on the second set of one or more associated sensor and radio network information data samples and the model; determining that the predicted future state of the radio network indicates that a predicted performance of the radio network is expected to be below a threshold; and performing at least one of the following to improve performance of the radio network: providing information, including the predicted future state of the radio network to a network optimization entity; performing or causing another entity to perform a non-radio network action; and performing or causing another entity to perform a radio network action.

Example 17

According to an example embodiment of the method of any of examples 1-16 wherein the sensor data samples comprise spatiotemporal sensor data samples associated with a physical environment.

Example 18

According to an example embodiment of the method of any of examples 1-17 wherein the receiving, from one or more sensors, sensor data samples comprises receiving sensor data samples associated with one or more of the following: a button, switch, or controller that controls an object or portion of the physical environment; a button, switch, or controller that controls a position, location, orientation or a movement of an object; a button, switch, or controller that controls a status or state of an object; a camera that captures images or video feed of an object or portion of a physical environment; and a sensor that detects a status or state of an object or portion of the physical environment.

Example 19

According to an example embodiment of the method of any of examples 1-18 wherein the receiving radio network information data samples associated with a radio network comprises receiving at least one of the following: a radio network key performance indicator for the radio network; information associated with a radio network action; and a radio network configuration parameter.

Example 20

According to an example embodiment of example 19 wherein the radio network key performance indicator comprises at least one of: a received signals strength; a total received power; a received interference power; and a signal to interference plus noise ratio (SINR); a pathloss; a reference signal received power; a reference signal received quality; a received signal strength indicator; a reliability; a block error rate; a latency; a jitter; a coverage; a capacity; a data transfer rate; a rank indicator; a modulation and coding scheme indicator; a channel state information; and a timing advance.

Example 21

According to an example embodiment of the method of any of examples 19-20 wherein the radio network configuration parameter for the radio network comprises at least one of an identifier, a configuration, or a coordinate of a base station or a user device.

Example 22

According to an example embodiment of the method of any of examples 1-21 wherein the determining one or more associated sensor and radio network information data samples comprises: determining, based on a time of one or more sensor data samples being within a time window of one or more of the radio network information data samples, one or more associated sensor and radio network information data samples.

Example 23

According to an example embodiment of the method of any of examples 1-22 and further comprising: labeling a reason for selection of the selected associated sensor and radio network information data samples that are relevant to performance of the radio network.

Example 24

An apparatus comprising means for performing a method of any of examples 1-23.

Example 25

A non-transitory computer-readable storage medium comprising instructions stored thereon that, when executed by at least one processor, are configured to cause a computing system to perform a method of any of examples 1-23.

Example 26

An apparatus comprising at least one processor and at least one memory including computer instructions, when executed by the at least one processor, cause the apparatus to perform a method of any of examples 1-23.

Example 27

An apparatus comprising at least one processor and at least one memory including computer instructions, when executed by the at least one processor, cause the apparatus to: receive, from one or more sensors, sensor data samples; receive radio network information data samples associated with a radio network; determine, based on an association of one or more received sensor data samples with one or more of the received radio network information data samples, a first set of one or more associated sensor and radio network information data samples; develop a model that is trained based on at least a portion of the first set the associated sensor and radio network information data samples that are relevant to performance of the radio network; and improve performance of the radio network based on at least the model.

Example 28

The apparatus of example 27 wherein causing the apparatus to improve performance of the radio network comprises causing the apparatus to: determine a second set of one or more associated sensor and radio network information data samples; and perform or cause another entity to perform one or more radio network actions and/or one or more non-radio network actions to improve the performance of the radio network, based on the model and the second set of one or more associated sensor and radio network information data samples.

Example 29

The apparatus of example 28 wherein causing the apparatus to perform or cause another entity to perform comprises causing the apparatus to perform or cause another entity to perform one or more preemptive actions including one or more radio network actions and/or one or more preemptive non-radio network actions based on the model and the second set of one or more associated sensor and radio network information data samples, wherein a preemptive action comprises an action that is estimated to at least reduce a decrease in performance of the radio network based on the model and the second set of one or more associated sensor and radio network information data samples.

Example 30

The apparatus of any of examples 28-29 wherein: the first set of one or more associated sensor and radio network information data samples comprises training data that is used to train the model; and the second set of one or more associated sensor and radio network information data samples comprises live data that is used, with the trained model, to perform or cause another entity to perform one or more radio network actions and/or one or more non-radio network actions to improve the performance of the radio network.

Example 31

The apparatus of any of examples 28-30 wherein causing the apparatus to perform or cause another entity to perform one or more radio network actions and/or one or more non-radio network actions comprises causing the apparatus to perform at least one of the following based on the model and the second set of one or more associated sensor and radio network information data samples: perform or cause another entity to perform one or more radio network actions; providing one or more input parameters to a network optimization entity or another entity; and perform or cause another entity to perform one or more non-radio network actions where an object or an aspect of a physical environment is changed.

Example 32

The apparatus of example 31 wherein causing the apparatus to perform or cause another entity to perform one or more non-radio network actions where an object or an aspect of a physical environment is changed comprises causing the apparatus to: perform or cause another entity to perform a change in a position, location, orientation, speed and/or movement of an object that impacts performance of the radio network.

Example 33

The apparatus of any of examples 27-32 wherein causing the apparatus to improve the performance of the radio network comprises causing the apparatus to perform a radio network action, comprising causing the apparatus to perform a radio network action related to at least one of the following: a handover of a user device to a target base station; a load balancing of traffic or data between two or more base stations; a link adaptation for a radio link between a base station and a user device; a cell selection or cell reselection performed by a user device; a scheduling; a resource allocation; a transmit power control; and a timing advance adjustment.

Example 34

The apparatus of any of examples 27-33 wherein the model comprises at least one neural network.

Example 35

The apparatus of any of examples 27-34, wherein causing the apparatus to develop a model that is trained comprises causing the apparatus to train the model based on at least one of: train the model using supervised learning; train the model using reinforcement learning; train the model using unsupervised learning; and train the model by cross-referencing different input modalities.

Example 36

The apparatus of any of examples 28-35, further comprising causing the apparatus to: determine a resulting change in a performance of the radio network in response to the one or more radio network actions and/or one or more non-radio network actions; and determine a reward associated with the performed one or more radio network actions and/or performed one or more non-radio network actions, wherein the reward is based on whether the performed one or more radio network actions and/or performed one or more non-radio network actions results in or is associated with an increase or decrease in performance of the radio network.

Example 37

The apparatus of any of examples 28-36, wherein causing the apparatus to develop a model comprises causing the apparatus to: train the model based on the first set of one or more associated sensor and radio network information data samples; and perform further training of the model based on the second set of one or more associated sensor and radio network information data samples and the performed one or more radio network actions and/or one or more non-radio network actions.

Example 38

The apparatus of any of examples 28-37, wherein causing the apparatus to develop a model that is trained comprises causing the apparatus to train the model based on causing the apparatus to: determine a resulting change in a performance of the radio network in response to the performed one or more radio network actions and/or performed one or more non-radio network actions; and train the model based on the second set of one or more associated sensor and radio network information data samples, the performed one or more radio network actions and/or the performed one or more non-radio network actions, and the determined resulting change in the performance of the radio network.

Example 39

The apparatus of any of examples 27-38 wherein causing the apparatus to improve performance of the radio network comprises causing the apparatus to output at least one of the following: a key performance indicator of the radio network for a next data sample; and an estimated best action and/or probability distribution over available actions or an estimated reward for each of one or more actions, using one or more of Q-Learning, policy gradient, or actor-critic algorithms.

Example 40

The apparatus of any of examples 27-39 wherein the model estimates a state transition function between inputs that include a plurality of associated sensor and radio network information data samples before time t and outputs that include one or more predicted sensor data samples and/or one or more predicted radio network information data samples after time t.

Example 41

The apparatus of any of examples 28-40 and further causing the apparatus to: determine a predicted future state of the radio network based on the second set of one or more associated sensor and radio network information data samples and the model; and improve performance of the radio network based on at least the predicted future state of the radio network.

Example 42

The apparatus of any of examples 28-41 and further causing the apparatus to: determine a predicted future state of the radio network based on the second set of one or more associated sensor and radio network information data samples and the model; determine that the predicted future state of the radio network indicates that a predicted performance of the radio network is expected to be below a threshold; and perform at least one of the following to improve performance of the radio network: provide information, including the predicted future state of the radio network to a network optimization entity; perform or causing another entity to perform a non-radio network action; and perform or causing another entity to perform a radio network action.

Example 43

The apparatus of any of examples 27-42 wherein the sensor data samples comprise spatiotemporal sensor data samples associated with a physical environment.

Example 44

The apparatus of any of examples 27-43 wherein causing the apparatus to receive, from one or more sensors, sensor data samples comprises causing the apparatus to receive sensor data samples associated with one or more of the following: a button, switch, or controller that controls an object or portion of the physical environment; a button, switch, or controller that controls a position, location, orientation or a movement of an object; a button, switch, or controller that controls a status or state of an object; a camera that captures images or video feed of an object or portion of a physical environment; and a sensor that detects a status or state of an object or portion of the physical environment.

Example 45

The apparatus of any of examples 27-44 wherein causing the apparatus to receive radio network information data samples associated with a radio network comprises causing the apparatus to receive at least one of the following: a radio network key performance indicator for the radio network; information associated with a radio network action; and a radio network configuration parameter.

Example 46

The apparatus of any of examples 27-45 wherein the radio network key performance indicator comprises at least one of: a received signals strength; a total received power; a received interference power; and a signal to interference plus noise ratio (SINR); a pathloss; a reference signal received power; a reference signal received quality; a received signal strength indicator; a reliability; a block error rate; a latency; a jitter; a coverage; a capacity; a data transfer rate; a rank indicator; a modulation and coding scheme indicator; a channel state information; and a timing advance.

Example 47

The apparatus of any of examples 45-46 wherein the radio network configuration parameter for the radio network comprises at least one of an identifier, a configuration, or a coordinate of a base station or a user device.

Example 48

The apparatus of any of examples 27-47 wherein causing the apparatus to determine one or more associated sensor and radio network information data samples comprises causing the apparatus to: determine, based on a time of one or more sensor data samples being within a time window of one or more of the radio network information data samples, one or more associated sensor and radio network information data samples.

Figure 27:
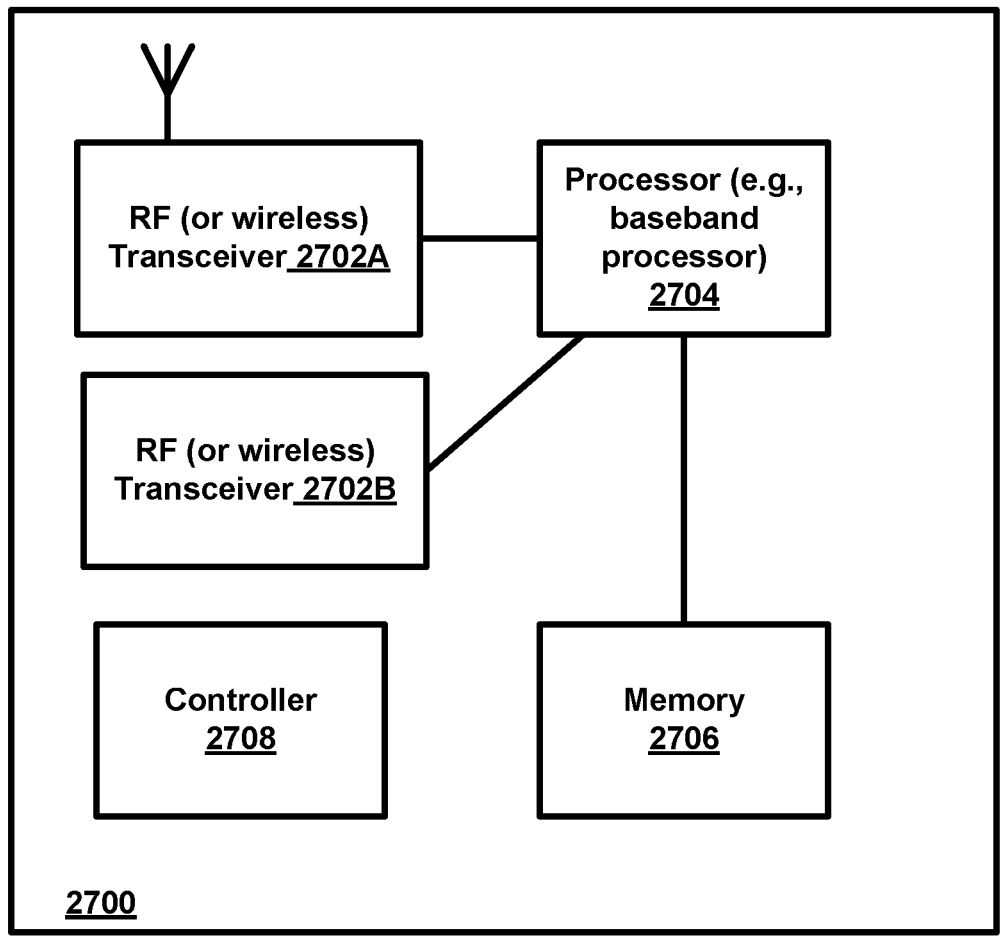
FIG. 27 is a block diagram of a wireless station (e.g., AP, BS or user device, or other network node) according to an example embodiment.

FIG. 27 is a block diagram of a wireless station (e.g., AP, BS or user device, or other network node) 2700 according to an example embodiment. The wireless station 2700 may include, for example, one or two RF (radio frequency) or wireless transceivers 2702A, 2702B, where each wireless transceiver includes a transmitter to transmit signals and a receiver to receive signals. The wireless station also includes a processor or control unit/entity (controller) 2704 to execute instructions or software and control transmission and receptions of signals, and a memory 2706 to store data and/or instructions.

Processor 2704 may also make decisions or determinations, generate frames, packets or messages for transmission, decode received frames or messages for further processing, and other tasks or functions described herein. Processor 2704, which may be a baseband processor, for example, may generate messages, packets, frames or other signals for transmission via wireless transceiver 2702 (2702A or 2702B). Processor 2704 may control transmission of signals or messages over a wireless network, and may control the reception of signals or messages, etc., via a wireless network (e.g., after being down-converted by wireless transceiver 2702, for example). Processor 2704 may be programmable and capable of executing software or other instructions stored in memory or on other computer media to perform the various tasks and functions described above, such as one or more of the tasks or methods described above. Processor 2704 may be (or may include), for example, hardware, programmable logic, a programmable processor that executes software or firmware, and/or any combination of these. Using other terminology, processor 2704 and transceiver 2702 together may be considered as a wireless transmitter/receiver system, for example.

In addition, referring to FIG. 27, a controller (or processor) 2708 may execute software and instructions, and may provide overall control for the station 2700, and may provide control for other systems not shown in FIG. 27, such as controlling input/output devices (e.g., display, keypad), and/ or may execute software for one or more applications that may be provided on wireless station 2700, such as, for example, an email program, audio/video applications, a word processor, a Voice over IP application, or other application or software.

In addition, a storage medium may be provided that includes stored instructions, which when executed by a controller or processor may result in the processor 2704, or other controller or processor, performing one or more of the functions or tasks described above.

According to another example embodiment, RF or wireless transceiver(s) 2702A/2702B may receive signals or data and/or transmit or send signals or data. Processor 2704 (and possibly transceivers 2702A/2702B) may control the RF or wireless transceiver 2702A or 2702B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD- ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising:
   at least one processor; and
   at least one memory including computer program code;
   the at least one memory and computer program code configured to, with the at least one processor, cause the apparatus at least to:
      receive, from one or more sensors associated with a physical environment, sensor data samples indicating a state of the physical environment or a change of the physical environment;
      receive radio network information data samples associated with a radio network, including at least one radio network performance indicator;
      determine, based on a time relationship of one or more received sensor data samples with one or more of the received radio network information data samples such that both the one or more received sensor data samples and the one or more received radio network information data samples arrived or have a time stamp within a time window, a first set of one or more associated sensor and radio network information data samples;
      select a portion of the first set of one or more associated sensor and radio network information data samples that are relevant to performance of the radio network, including select one or more associated sensor and radio network information data samples that are associated with a change in radio network performance;
      label a reason for selection of the selected associated sensor and radio network information data samples that are relevant to performance of the radio network;
      develop a model that is trained based on at least the portion of the first set of one or more associated sensor and radio network information data samples that are relevant to performance of the radio network; and
      improve performance of the radio network based on at least the model.

2. The apparatus of claim 1 wherein the computer program code configured to, with the at least one processor, cause the apparatus to improve performance of the radio network comprises the computer program code configured to, with the at least one processor, cause the apparatus to:
   determine a second set of one or more associated sensor and radio network information data samples; and
   perform or cause another entity to perform one or more radio network actions and/or one or more non-radio network actions to improve the performance of the radio network, based on the model and the second set of one or more associated sensor and radio network information data samples.

3. The apparatus of claim 1 wherein the computer program code configured to, with the at least one processor, cause the apparatus to perform or cause another entity to perform comprises the computer program code configured to, with the at least one processor, cause the apparatus to perform or cause another entity to perform one or more preemptive actions including one or more radio network actions and/or one or more preemptive non-radio network actions based on the model and the second set of one or more associated sensor and radio network information data samples, wherein a preemptive action comprises an action that is estimated to at least reduce a decrease in performance of the radio network based on the model and the second set of one or more associated sensor and radio network information data samples.

4. The apparatus of claim 1 wherein:
   the first set of one or more associated sensor and radio network information data samples comprises training data that is used to train the model; and
   the second set of one or more associated sensor and radio network information data samples comprises live data that is used, with the trained model, to perform or cause another entity to perform one or more radio network actions and/or one or more non-radio network actions to improve the performance of the radio network.

5. The apparatus of claim 1 wherein the computer program code configured to, with the at least one processor, cause the apparatus to perform or cause another entity to perform one or more radio network actions and/or one or more non-radio network actions comprises the computer program code configured to, with the at least one processor, cause the apparatus to perform at least one of the following based on the model and the second set of one or more associated sensor and radio network information data samples:
   perform or cause another entity to perform one or more radio network actions;
   provide one or more input parameters to a network optimization entity or another entity; and
   perform or cause another entity to perform one or more non-radio network actions where an object or an aspect of a physical environment is changed.

6. The apparatus of claim 5 wherein the computer program code configured to, with the at least one processor, cause the apparatus to perform or cause another entity to perform one or more non-radio network actions where an object or an aspect of a physical environment is changed comprises the computer program code configured to, with the at least one processor, cause the apparatus to:
perform or cause another entity to perform a change in a position, location, orientation, speed and/or movement of an object that impacts performance of the radio network.

7. The apparatus of claim 1 wherein the computer program code configured to, with the at least one processor, cause the apparatus to improve the performance of the radio network comprises the computer program code configured to, with the at least one processor, cause the apparatus to perform a radio network action related to at least one of the following:
a handover of a user device to a target base station;
a load balancing of traffic or data between two or more base stations;
a link adaptation for a radio link between a base station and a user device;
a cell selection or cell reselection performed by a user device;
a scheduling;
a resource allocation;
a transmit power control; and
a timing advance adjustment.

8. The apparatus of claim 1 wherein the model comprises at least one neural network.

9. The apparatus of claim 1 wherein the computer program code configured to, with the at least one processor, cause the apparatus to develop a model that is trained comprises the computer program code configured to, with the at least one processor, cause the apparatus to train the model based on at least one of:
train the model using supervised learning;
train the model using reinforcement learning;
train the model using unsupervised learning; and
train the model by cross-referencing different input modalities.

10. The apparatus of claim 1 wherein the computer program code configured to, with the at least one processor, further cause the apparatus to:
determine a resulting change in a performance of the radio network in response to the one or more radio network actions and/or one or more non-radio network actions; and
determine a reward associated with the performed one or more radio network actions and/or performed one or more non-radio network actions, wherein the reward is based on whether the performed one or more radio network actions and/or performed one or more non-radio network actions results in or is associated with an increase or decrease in performance of the radio network.

11. The apparatus of claim 1 wherein the computer program code configured to, with the at least one processor, cause the apparatus to develop a model comprises the computer program code configured to, with the at least one processor, cause the apparatus to:
train the model based on the first set of one or more associated sensor and radio network information data samples; and
perform further training of the model based on the second set of one or more associated sensor and radio network information data samples and the performed one or more radio network actions and/or one or more non-radio network actions.

12. The apparatus of claim 2 wherein the computer program code configured to, with the at least one processor, cause the apparatus to develop a model that is trained comprises the computer program code configured to, with the at least one processor, cause the apparatus to train the model based on causing the apparatus to:
determine a resulting change in a performance of the radio network in response to the performed one or more radio network actions and/or performed one or more non-radio network actions; and
train the model based on the second set of one or more associated sensor and radio network information data samples, the performed one or more radio network actions and/or the performed one or more non-radio network actions, and the determined resulting change in the performance of the radio network.

13. The apparatus claim 1 wherein the computer program code configured to, with the at least one processor, cause the apparatus to improve performance of the radio network comprises the computer program code configured to, with the at least one processor, cause the apparatus to output at least one of the following:
a key performance indicator of the radio network for a next data sample; and
an estimated best action and/or probability distribution over available actions or an estimated reward for each of one or more actions, using one or more of Q-Learning, policy gradient, or actor-critic algorithms.

14. The apparatus of claim 1 wherein the model estimates a state transition function between inputs that include a plurality of associated sensor and radio network information data samples before time t and outputs that include one or more predicted sensor data samples and/or one or more predicted radio network information data samples after time t.

15. The apparatus of claim 1 wherein the computer program code configured to, with the at least one processor, further cause the apparatus to:
determine a predicted future state of the radio network based on the second set of one or more associated sensor and radio network information data samples and the model; and
improve performance of the radio network based on at least the predicted future state of the radio network.

16. The apparatus of claim 1 wherein the computer program code configured to, with the at least one processor, further cause the apparatus to:
determine a predicted future state of the radio network based on the second set of one or more associated sensor and radio network information data samples and the model;
determine that the predicted future state of the radio network indicates that a predicted performance of the radio network is expected to be below a threshold; and
perform at least one of the following to improve performance of the radio network:
provide information, including the predicted future state of the radio network to a network optimization entity;
perform or causing another entity to perform a non-radio network action; and
perform or causing another entity to perform a radio network action.

17. The apparatus of claim 1 wherein the sensor data samples comprise spatiotemporal sensor data samples associated with a physical environment.

18. The apparatus of claim 1 wherein the computer program code configured to, with the at least one processor, cause the apparatus to receive, from one or more sensors, sensor data samples comprises wherein the computer program code configured to, with the at least one processor, cause the apparatus to receive sensor data samples associated with one or more of the following:
 a button, switch, or controller that controls an object or portion of the physical environment;
 a button, switch, or controller that controls a position, location, orientation or a movement of an object;
 a button, switch, or controller that controls a status or state of an object;
 a camera that captures images or video feed of an object or portion of a physical environment; and
 a sensor that detects a status or state of an object or portion of the physical environment.

19. The apparatus of claim 1 wherein the computer program code configured to, with the at least one processor, cause the apparatus to receive radio network information data samples associated with a radio network comprises wherein the computer program code configured to, with the at least one processor, cause the apparatus to receive at least two of the following:
 a radio network key performance indicator for the radio network;
 information associated with a radio network action; and
 a radio network configuration parameter.

20. The apparatus of claim 19 wherein the radio network key performance indicator comprises at least one of:
 a received signals strength;
 a total received power;
 a received interference power; and
 a signal to interference plus noise ratio (SINR);
 a pathloss;
 a reference signal received power;
 a reference signal received quality;
 a received signal strength indicator;
 a reliability;
 a block error rate;
 a latency;
 a jitter;
 a coverage;
 a capacity;
 a data transfer rate;
 a rank indicator;
 a modulation and coding scheme indicator;
 a channel state information; and
 a timing advance.

21. The apparatus of claim 18 wherein the radio network configuration parameter for the radio network comprises at least one of an identifier, a configuration, or a coordinate of a base station or a user device.

22. The apparatus of claim 1 wherein the computer program code configured to, with the at least one processor, cause the apparatus to determine one or more associated sensor and radio network information data samples comprises the computer program code configured to, with the at least one processor, cause the apparatus to:
 determine, based on a time of one or more sensor data samples being within a time window of one or more of the radio network information data samples, one or more associated sensor and radio network information data samples.

23. A method comprising:
 receiving, from one or more sensors associated with a physical environment, sensor data samples indicating a state of the physical environment or a change of the physical environment;
 receiving radio network information data samples associated with a radio network, including at least one radio network performance indicator;
 determining, based on a time relationship of one or more received sensor data samples with one or more of the received radio network information data samples such that both the one or more received sensor data samples and the one or more received radio network information data samples arrived or have a time stamp within a time window, a first set of one or more associated sensor and radio network information data samples;
 selecting a portion of the first set of one or more associated sensor and radio network information data samples that are relevant to performance of the radio network, including selecting one or more associated sensor and radio network information data samples that are associated with a change in radio network performance;
 labeling a reason for selection of the selected associated sensor and radio network information data samples that are relevant to performance of the radio network;
 developing a model that is trained based on at least the portion of the first set of one or more associated sensor and radio network information data samples that are relevant to performance of the radio network; and
 improving performance of the radio network based on at least the model.

24. The method of claim 23 wherein the improving performance of the radio network comprises:
 determining a second set of one or more associated sensor and radio network information data samples;
 performing or causing another entity to perform one or more radio network actions and/or one or more non-radio network actions to improve the performance of the radio network, based on the model and the second set of one or more associated sensor and radio network information data samples.

25. The method of claim 23 wherein the performing or causing another entity to perform comprises performing or causing another entity to perform one or more preemptive actions including one or more radio network actions and/or one or more preemptive non-radio network actions based on the model and the second set of one or more associated sensor and radio network information data samples, wherein a preemptive action comprises an action that is estimated to at least reduce a decrease in performance of the radio network based on the model and the second set of one or more associated sensor and radio network information data samples.

26. The method of claim 23 wherein:
 the first set of one or more associated sensor and radio network information data samples comprises training data that is used to train the model; and
 the second set of one or more associated sensor and radio network information data samples comprises live data that is used, with the trained model, to perform or cause another entity to perform one or more radio network actions and/or one or more non-radio network actions to improve the performance of the radio network.

27. The method of claim 24 wherein the performing or causing another entity to perform one or more radio network actions and/or one or more non-radio network actions comprises performing at least one of the following based on the model and the second set of one or more associated sensor and radio network information data samples:
   performing or causing another entity to perform one or more radio network actions;
   providing one or more input parameters to a network optimization entity or another entity;
   performing or causing another entity to perform one or more non-radio network actions where an object or an aspect of a physical environment is changed.

28. A non-transitory computer-readable storage medium comprising instructions stored thereon that, when executed by at least one processor, are configured to cause a computing system to:
   receive, from one or more sensors associated with a physical environment, sensor data samples indicating a state of the physical environment or a change of the physical environment;
   receive radio network information data samples associated with a radio network, including at least one radio network performance indicator;
   determine, based on a time relationship of one or more received sensor data samples with one or more of the received radio network information data samples such that both the one or more received sensor data samples and the one or more received radio network information data samples arrived or have a time stamp within a time window, a first set of one or more associated sensor and radio network information data samples;
   select a portion of the first set of one or more associated sensor and radio network information data samples that are relevant to performance of the radio network, including select one or more associated sensor and radio network information data samples that are associated with a change in radio network performance;
   label a reason for selection of the selected associated sensor and radio network information data samples that are relevant to performance of the radio network;
   develop a model that is trained based on at least the portion of the first set of one or more associated sensor and radio network information data samples that are relevant to performance of the radio network; and
   improve performance of the radio network based on at least the model.

* * * * *